(12) United States Patent
Lifschultz

(10) Patent No.: US 10,462,637 B1
(45) Date of Patent: Oct. 29, 2019

(54) INFORMATION EXCHANGING SYSTEM

(71) Applicant: David Lifschultz, Henderson, NV (US)

(72) Inventor: David Lifschultz, Henderson, NV (US)

( * ) Notice: Subject to any disclaimer, the term of this patent is extended or adjusted under 35 U.S.C. 154(b) by 0 days.

(21) Appl. No.: 16/166,507

(22) Filed: Oct. 22, 2018

Related U.S. Application Data

(63) Continuation of application No. 15/793,055, filed on Oct. 25, 2017, now Pat. No. 10,237,713, which is a continuation-in-part of application No. 14/728,776, filed on Jun. 2, 2015, now Pat. No. 9,832,262.

(51) Int. Cl.
| | |
|---|---|
| *H04W 4/80* | (2018.01) |
| *H04W 76/14* | (2018.01) |
| *H04L 29/08* | (2006.01) |
| *H04B 5/00* | (2006.01) |
| *G06F 16/9535* | (2019.01) |

(52) U.S. Cl.
CPC .......... *H04W 4/80* (2018.02); *G06F 16/9535* (2019.01); *H04B 5/0031* (2013.01); *H04L 67/1095* (2013.01); *H04L 67/306* (2013.01); *H04W 76/14* (2018.02)

(58) Field of Classification Search
CPC ..................................................... H04W 4/08
See application file for complete search history.

(56) References Cited

U.S. PATENT DOCUMENTS

| | | | | |
|---|---|---|---|---|
| 9,448,980 B1 * | 9/2016 | Ellingson | ............... | G06Q 50/01 |
| 9,729,555 B2 * | 8/2017 | Ferguson | ............... | H04L 63/104 |
| 2002/0174238 A1 * | 11/2002 | Sinn | ........................ | G06Q 10/06 |
| | | | | 709/229 |
| 2006/0271391 A1 * | 11/2006 | Lee | ......................... | G06Q 30/02 |
| | | | | 705/1.1 |
| 2009/0089316 A1 * | 4/2009 | Kogan | .............. | G06F 17/30525 |
| 2010/0005520 A1 * | 1/2010 | Abbot | ..................... | G06Q 10/10 |
| | | | | 726/6 |
| 2011/0124323 A1 * | 5/2011 | Selph | .................... | H04M 1/645 |
| | | | | 455/415 |
| 2012/0110621 A1 * | 5/2012 | Gossweiler, III | ...... | G06Q 50/01 |
| | | | | 725/46 |
| 2013/0002676 A1 * | 1/2013 | Ziemann | ................. | G06T 11/20 |
| | | | | 345/440 |
| 2014/0012908 A1 * | 1/2014 | Manry | ................... | G06Q 10/10 |
| | | | | 709/204 |

(Continued)

*Primary Examiner* — Wen W Huang

(74) *Attorney, Agent, or Firm* — Plager Schack LLP; Mark H. Plager; Stephen Hallberg

(57) ABSTRACT

A system for facilitating personal information exchange includes a first computer peripheral device comprising a first near field communication system. A second computer peripheral device includes a second near field communication system. The first near field communication system is communicatively coupled to the second near field communication system. A web server is communicatively coupled to the first computer peripheral device and the second computer peripheral device. The web server is configured to receive personal information from the first computer peripheral device and the second computer peripheral device into a database. The near field communication between the first computer peripheral device and the second computer peripheral device results in sharing the information in the database.

13 Claims, 19 Drawing Sheets

(56) References Cited

U.S. PATENT DOCUMENTS

| | | | |
|---|---|---|---|
| 2014/0025598 A1* | 1/2014 | Weingarten | G06Q 10/00 705/321 |
| 2014/0317008 A1* | 10/2014 | Wilner | G06Q 10/105 705/320 |
| 2016/0057154 A1* | 2/2016 | Ferguson | H04L 63/104 726/7 |
| 2016/0379313 A1* | 12/2016 | Dugan | H04L 51/32 705/319 |
| 2017/0012987 A1* | 1/2017 | Gupta | G06Q 10/10 |

* cited by examiner

INFORMATION EXCHANGING SYSTEM

CLAIM OF BENEFIT TO PRIOR APPLICATION

This application is a continuation of and claims benefit to United States Non-Provisional patent application Ser. No. 15/793,055, entitled "INFORMATION EXCHANGING SYSTEM," filed Oct. 25, 2017. The United States Non-Provisional patent application Ser. No. 15/793,055 is incorporated herein by reference.

BACKGROUND

The embodiments herein relate generally to systems that facilitate the exchange of information. Prior to embodiments of the disclosed invention, with the advent of mobile phones and social networking people do not have a way to exchange contact information electronically with people the way they do in the real world.

For instance, when two mobile device users encounter each other, they may wish to exchange contact information, but without a convenient electronic manner of exchanging such information, one or both of the users may then resort to manually inputting the other user's contact information into their respective mobile device. This manual process is generally prone to user error and is often slower than an electronic exchange of information. Naturally, many users of computing devices find this to be a problem.

Therefore, what is needed is a way to electronically and conveniently exchange personal information, such as contact information.

BRIEF DESCRIPTION

Some embodiments include a novel information exchanging system and a plurality of novel information exchanging processes that facilitate personal information exchange between users of digital electronic devices.

In some embodiments, the information exchanging system includes a first computing device with a first near field communication system and a second computing device with a second near field communication system. In some embodiments, the information exchanging system facilitates the exchange of personal information between users of the first computing device and the second computing device when the first near field communication system is communicatively coupled to the second near field communication system. In some embodiments, the information exchanging system further includes a web server computing device that is communicatively coupled to the first computing device and the second computing device. In some embodiments, the web server computing device includes a processor, a database, and an information exchanging program. In some embodiments, when the information exchanging program is running on the processor, the web server computing device is configured to receive personal information from the first computing device and the second computing device and to store the received personal information in the database. Once the devices are linked, the near field communication between the first computing device and the second computing device results in sharing the required information in the database.

In some embodiments, the plurality of information exchanging processes includes a plurality of information exchange establishment processes that establish a connection to exchange personal information between a first computing device and a second computing device. In some embodiments, the plurality of information exchange establishment processes comprises an information exchange request process and an information exchange acceptance process.

In some embodiments, the plurality of information exchanging processes includes an information update process for updating information exchanged between the first computing device and the second computing device.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
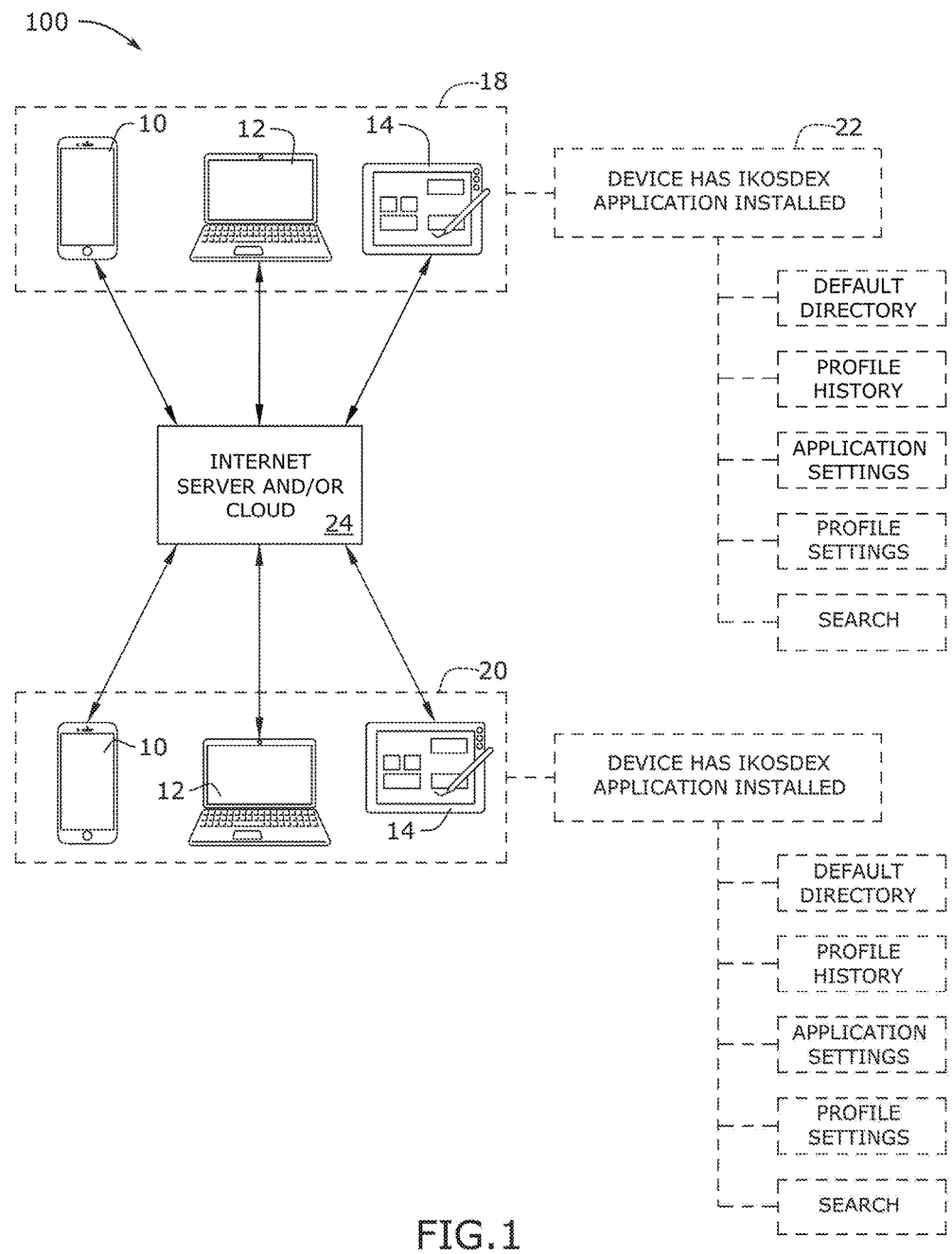

Having thus described the invention in general terms, reference is now made to the accompanying drawings, which are not necessarily drawn to scale, and which show different views of different example embodiments, and wherein:

FIG. 1 conceptually illustrates an architecture of an information exchanging system in some embodiments.

Figure 2:
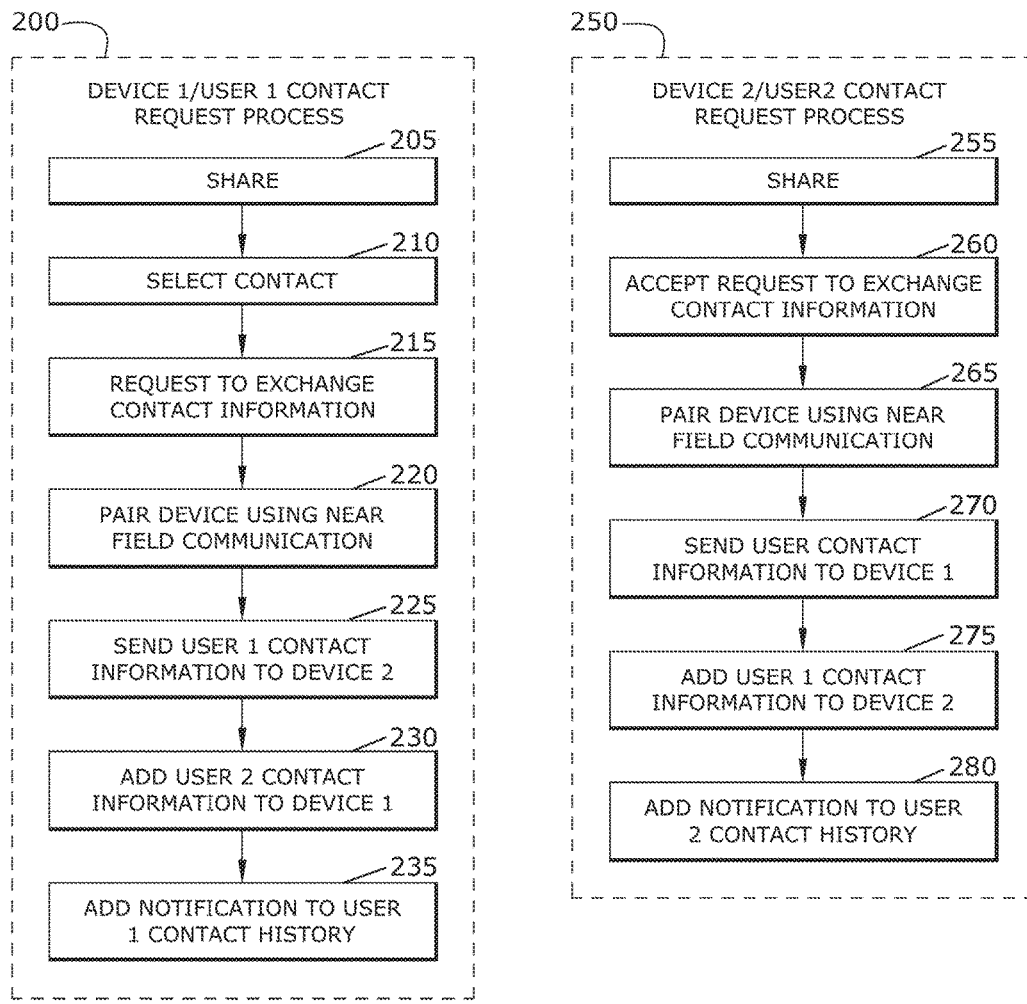

FIG. 2 conceptually illustrates corresponding processes for exchanging information between two devices in some embodiments.

Figure 3:
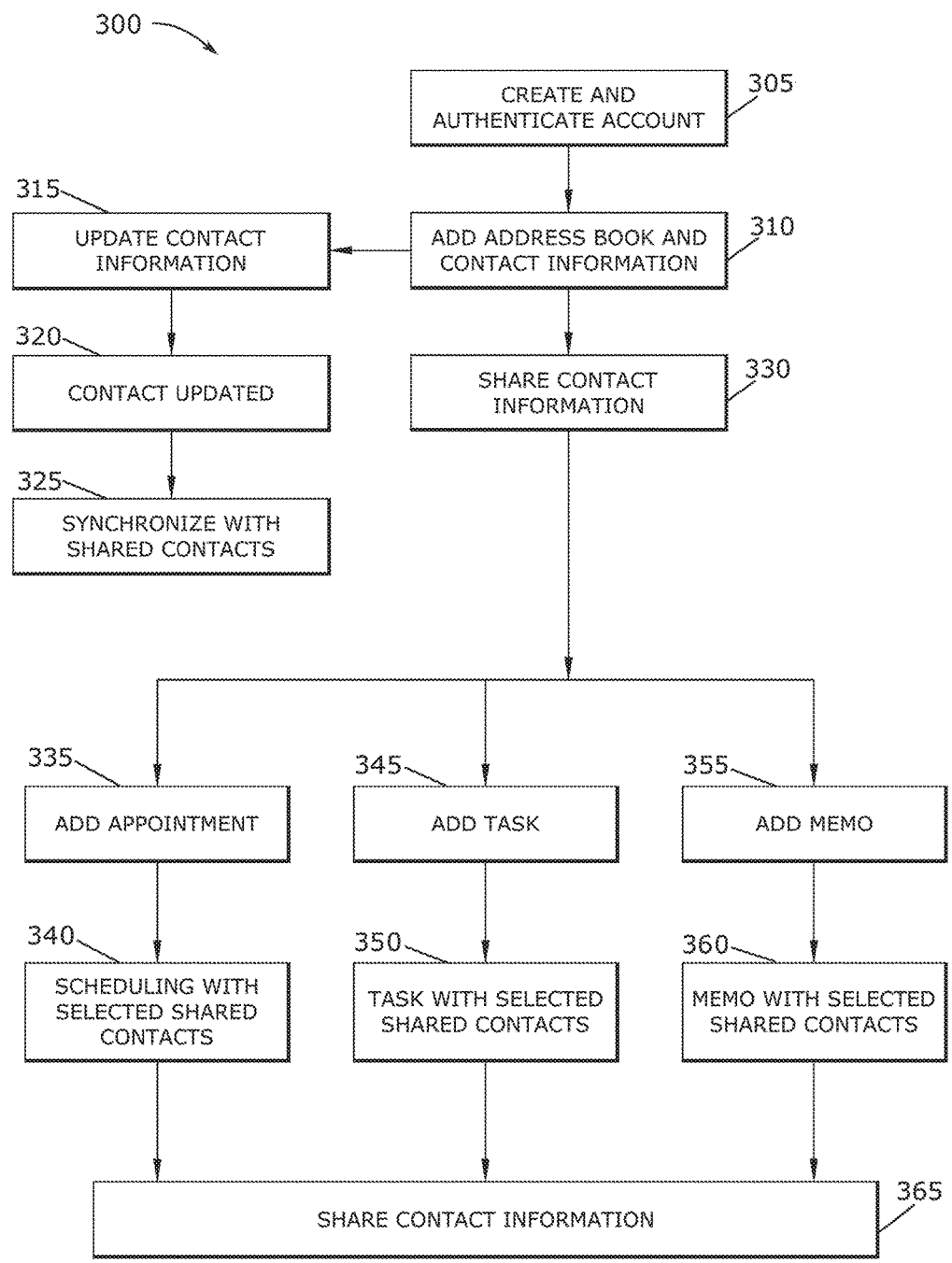

FIG. 3 conceptually illustrates a process for using an information exchanging system in some embodiments.

Figure 4:
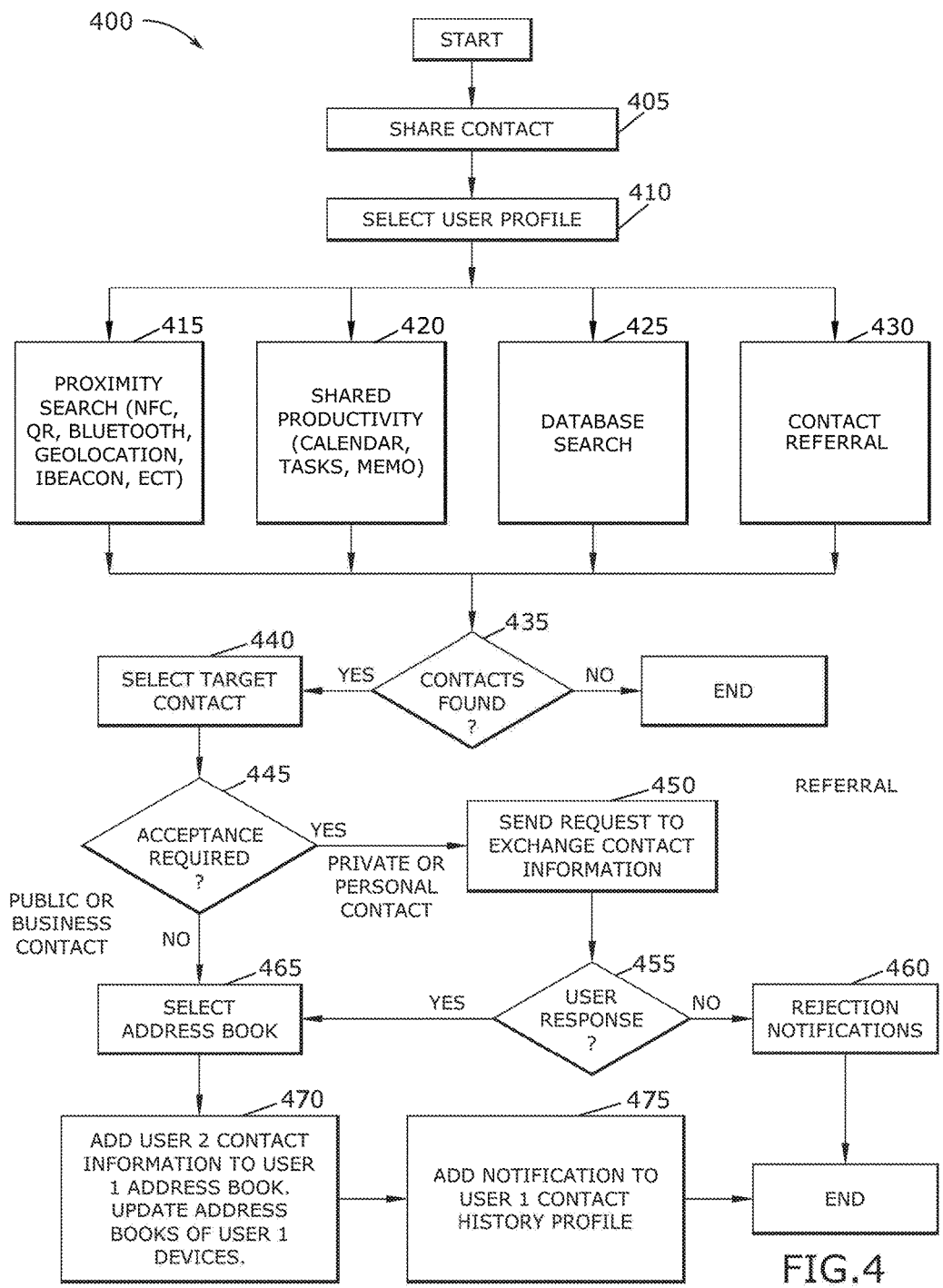

FIG. 4 conceptually illustrates a process for requesting information exchange in some embodiments.

Figure 5:
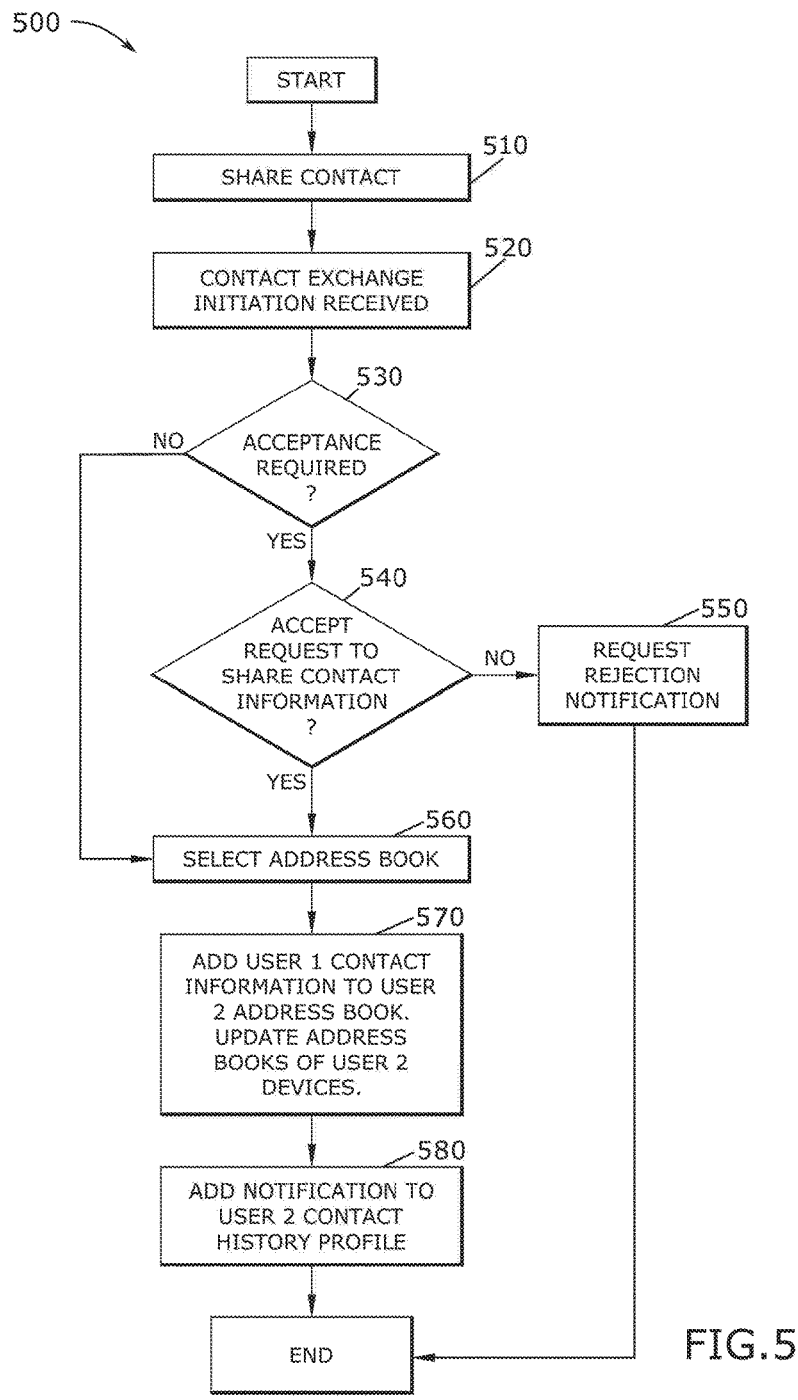

FIG. 5 conceptually illustrates a process for accepting an information exchange request in some embodiments.

Figure 6:
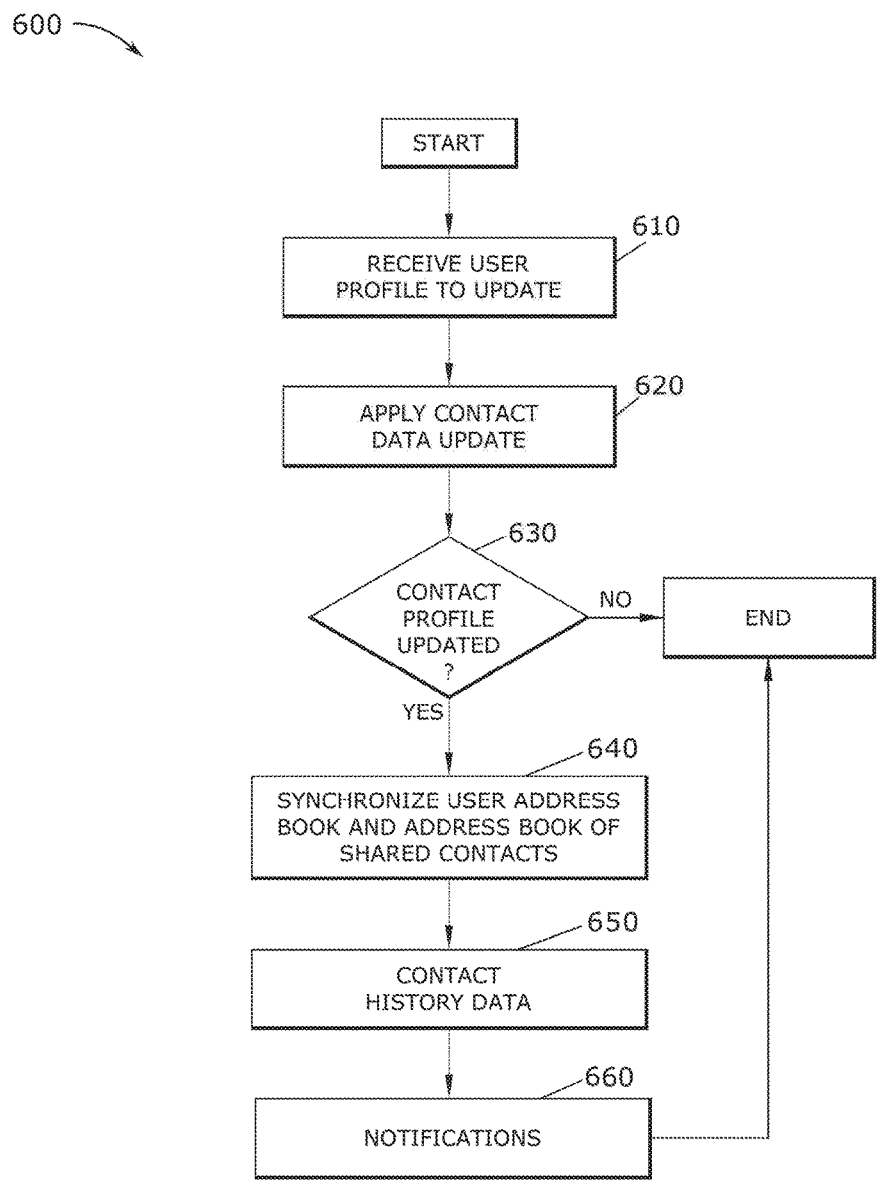

FIG. 6 conceptually illustrates a process for updating contact information associated with contact information received during an exchange of information in some embodiments.

Figure 7:
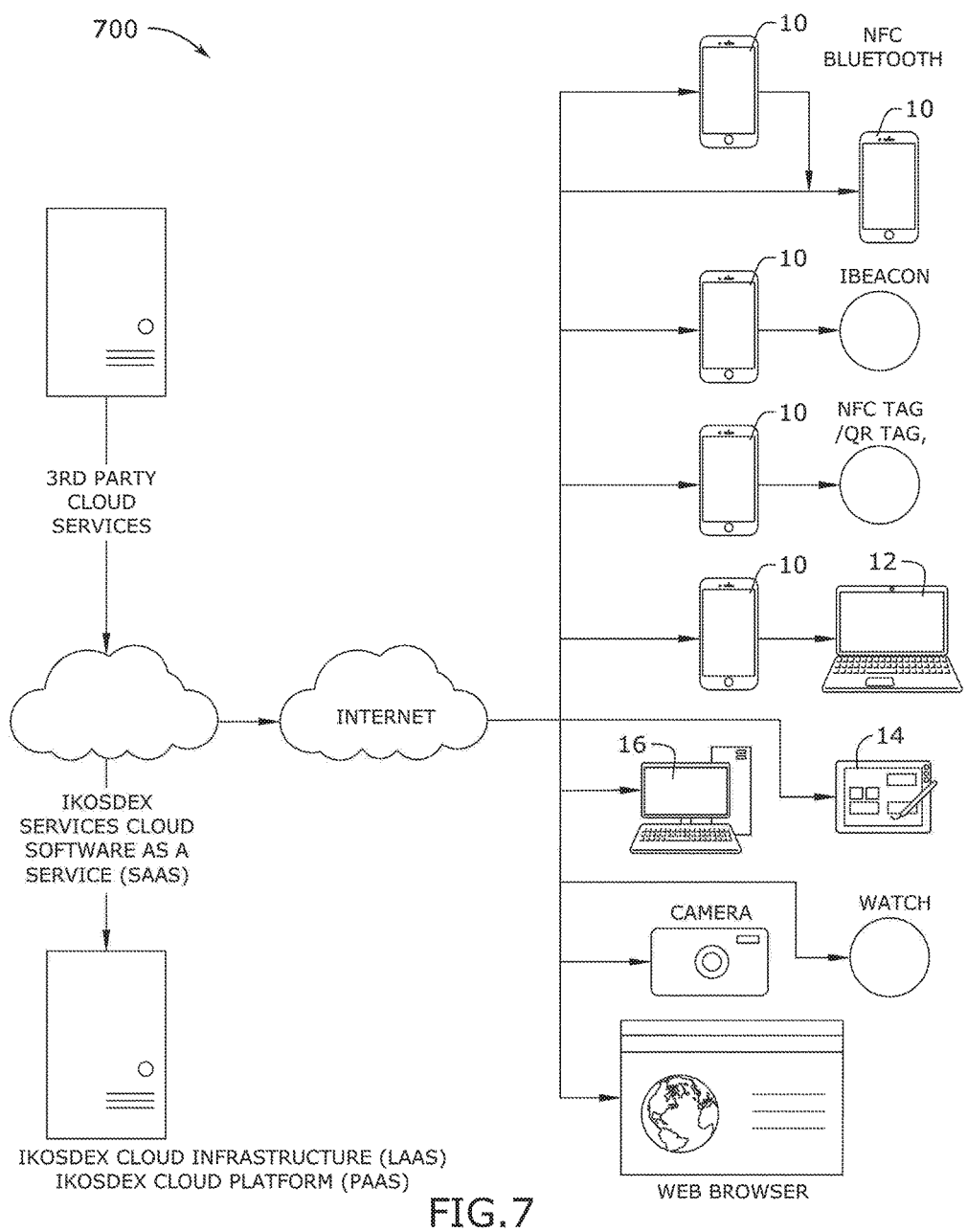

FIG. 7 conceptually illustrates a network architecture of an information exchanging system in some embodiments.

Figure 8:
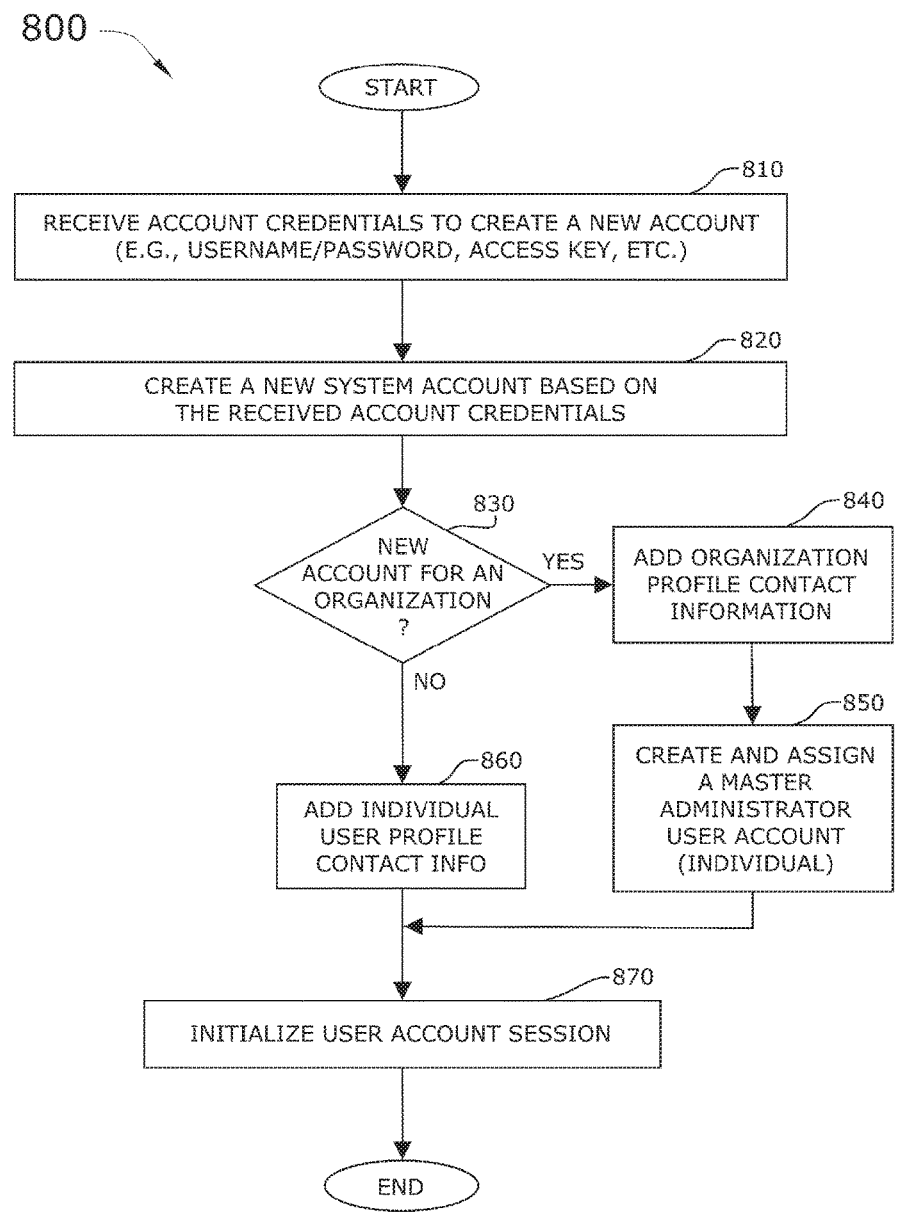

FIG. 8 conceptually illustrates a process for creating and authenticating individual and organization accounts in an information exchanging system in some embodiments.

Figure 9:
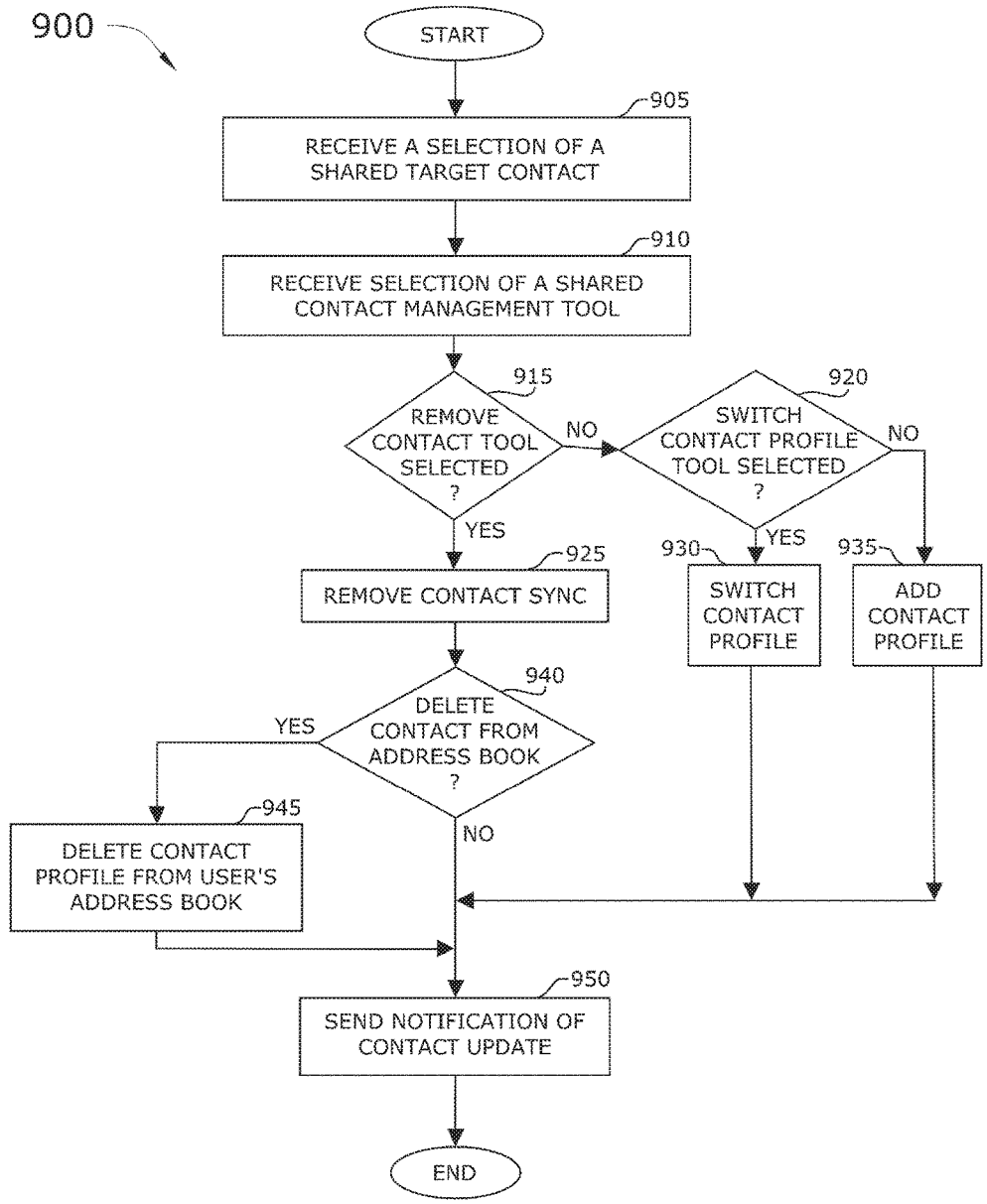

FIG. 9 conceptually illustrates a process for adding, switching, and removing contact profiles previously shared with other users of an information exchanging system in some embodiments.

Figure 10:
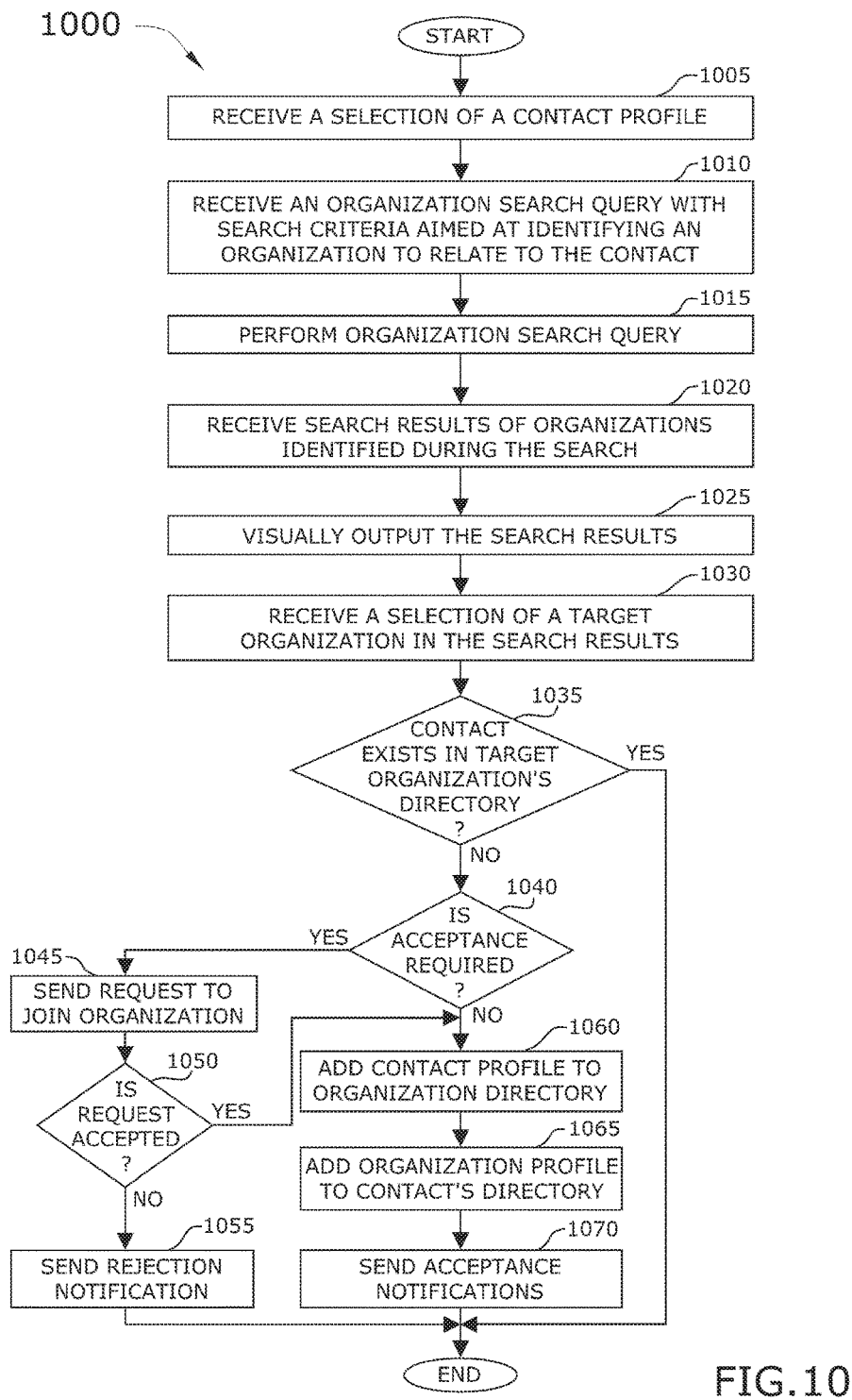

FIG. 10 conceptually illustrates an individual to organization relation process for requesting to join an organization's directory by a requesting individual in some embodiments.

Figure 11:
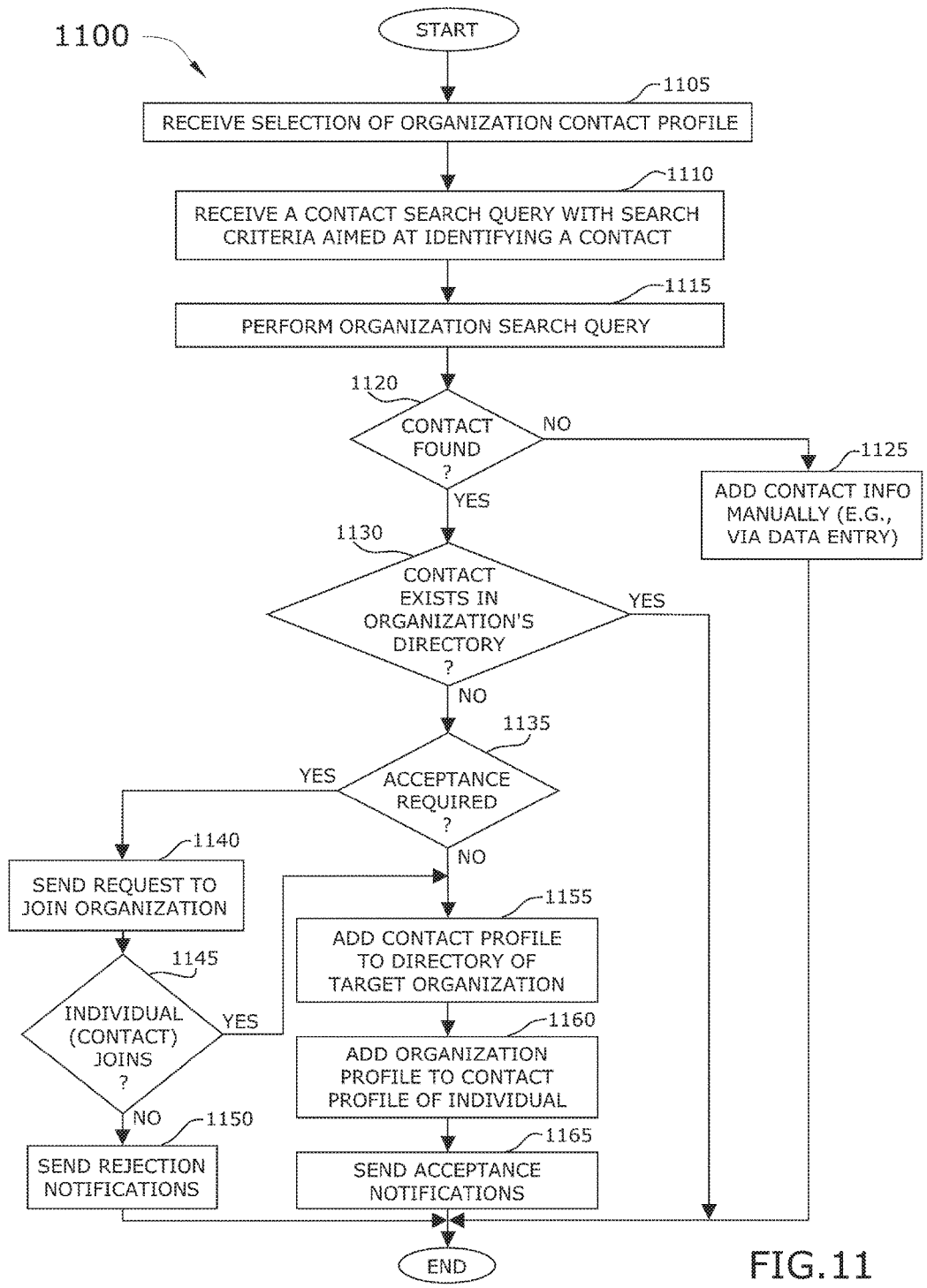

FIG. 11 conceptually illustrates an organization to individual relation process for requesting an individual to join an organization's directory by as requested by the organization in some embodiments.

Figure 12:
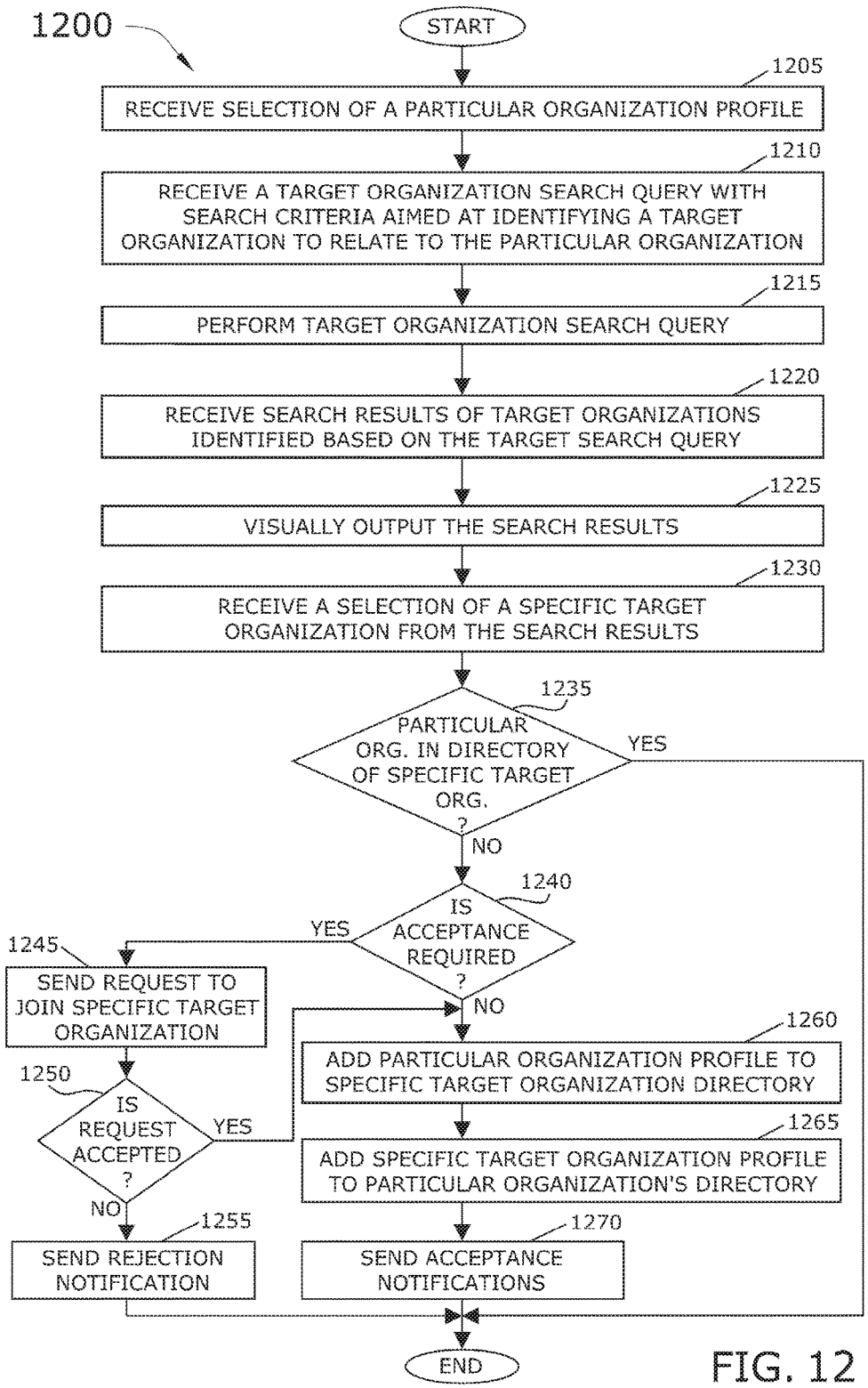

FIG. 12 conceptually illustrates an organization to organization relation process for joining an organization's directory by another organization in some embodiments.

Figure 13:
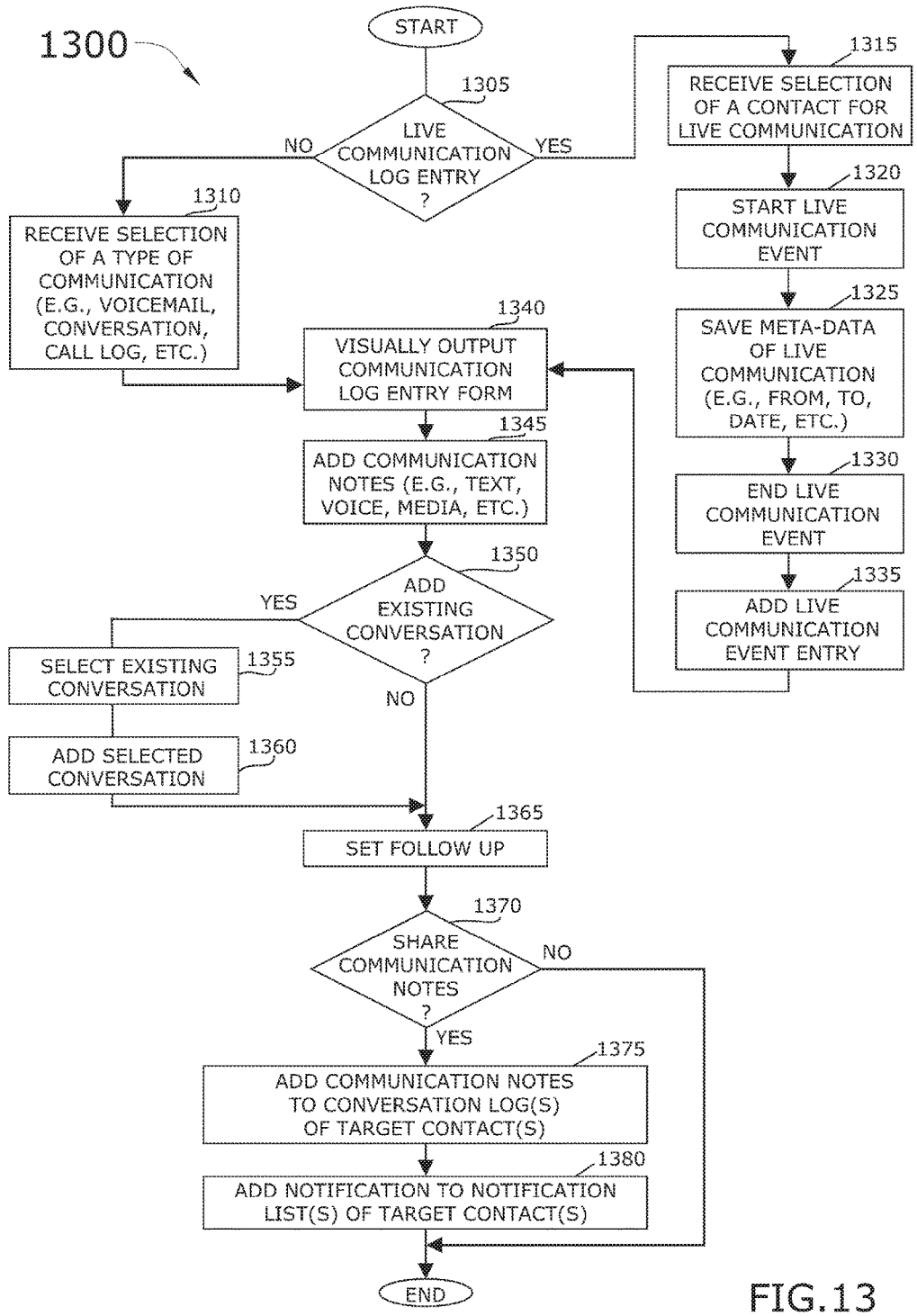

FIG. 13 conceptually illustrates a process for adding a conversation log entry in some embodiments.

Figure 14:
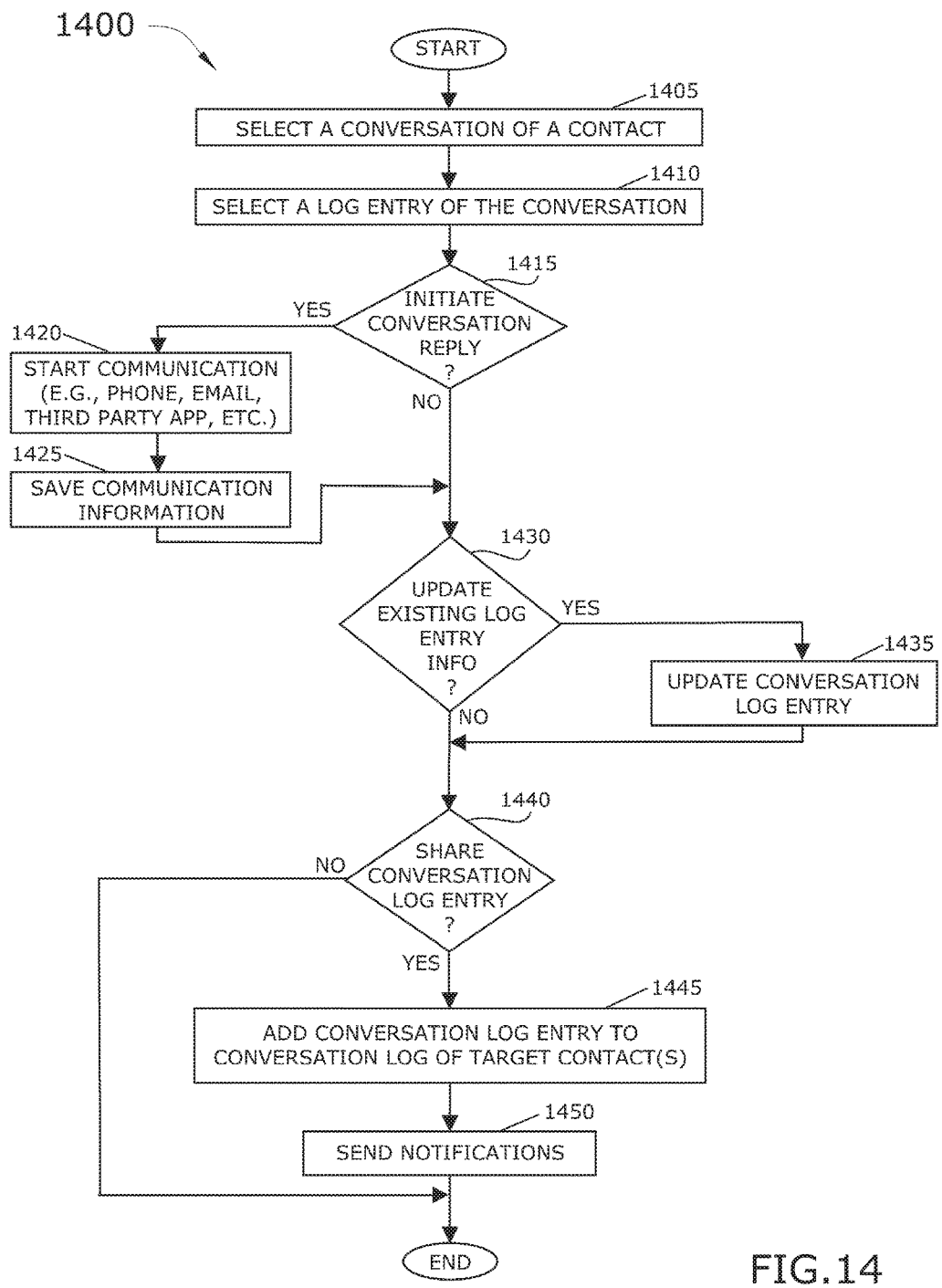

FIG. 14 conceptually illustrates a process for updating a conversation log entry in some embodiments.

Figure 15:
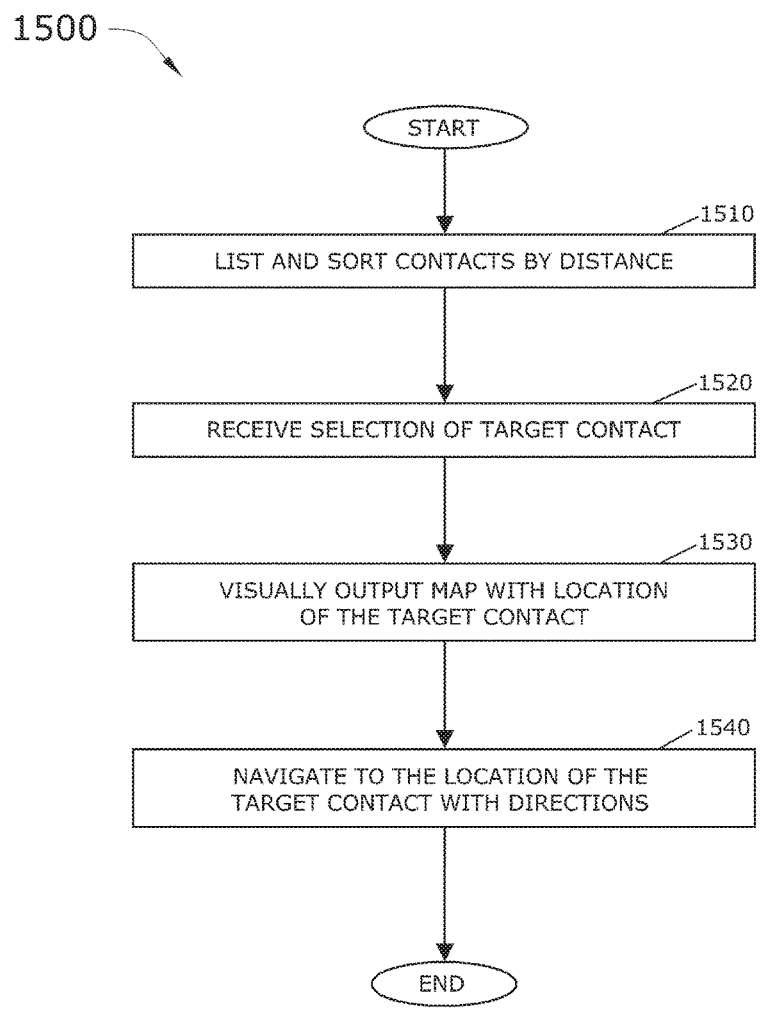

FIG. 15 conceptually illustrates a process for mapping directions to a contact in some embodiments.

Figure 16:
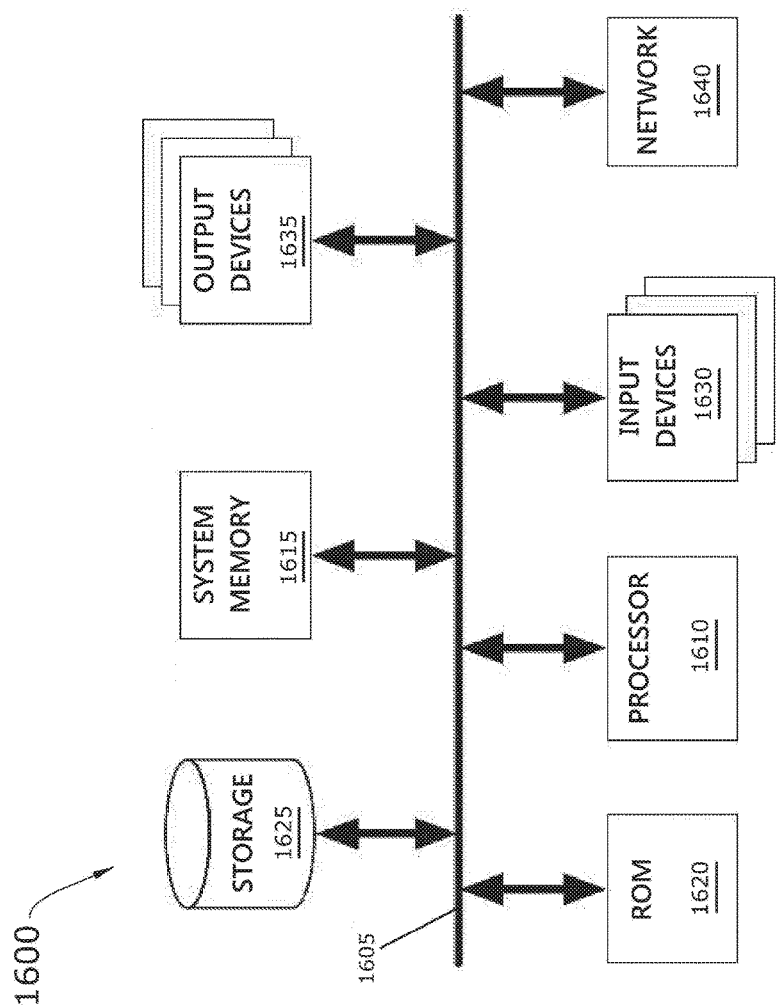

FIG. 16 conceptually illustrates an electronic system with which some embodiments of the invention are implemented.

Figure 17:
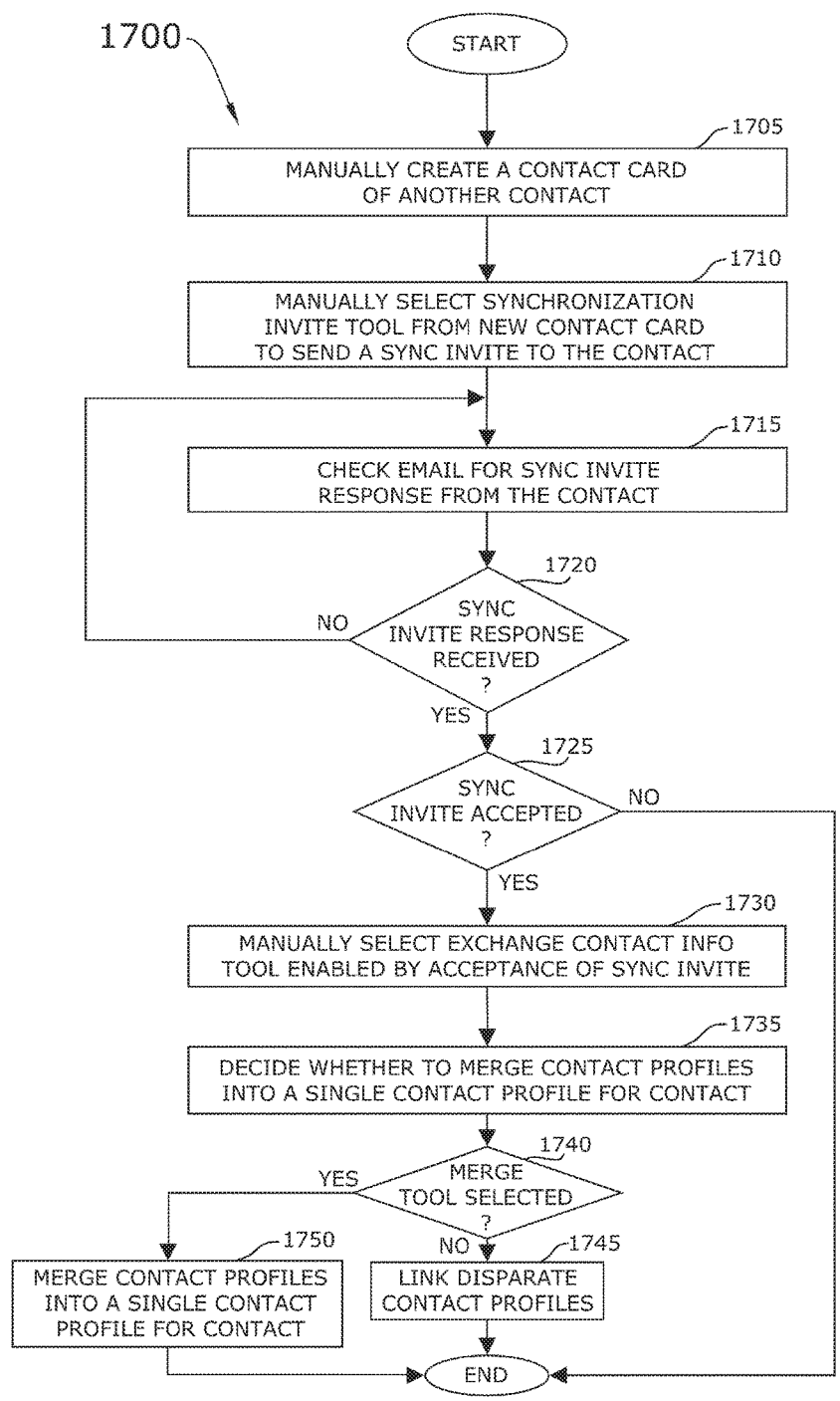

FIG. 17 conceptually illustrates a manual process for adding a contact to exchange contact information by way of an information exchanging system in some embodiments.

Figure 18:
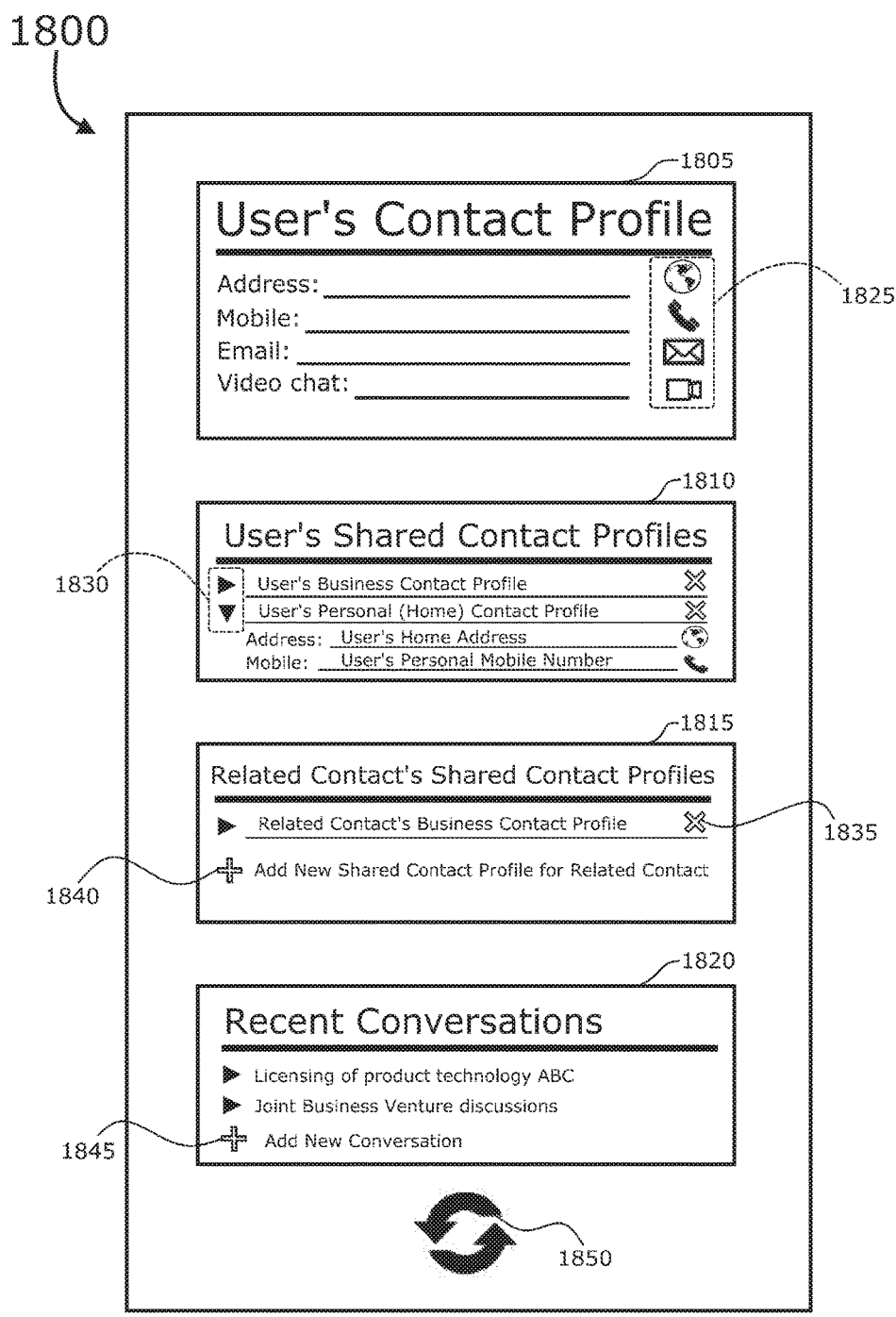

FIG. 18 conceptually illustrates a user interface to view and manage a contact share.

Figure 19:
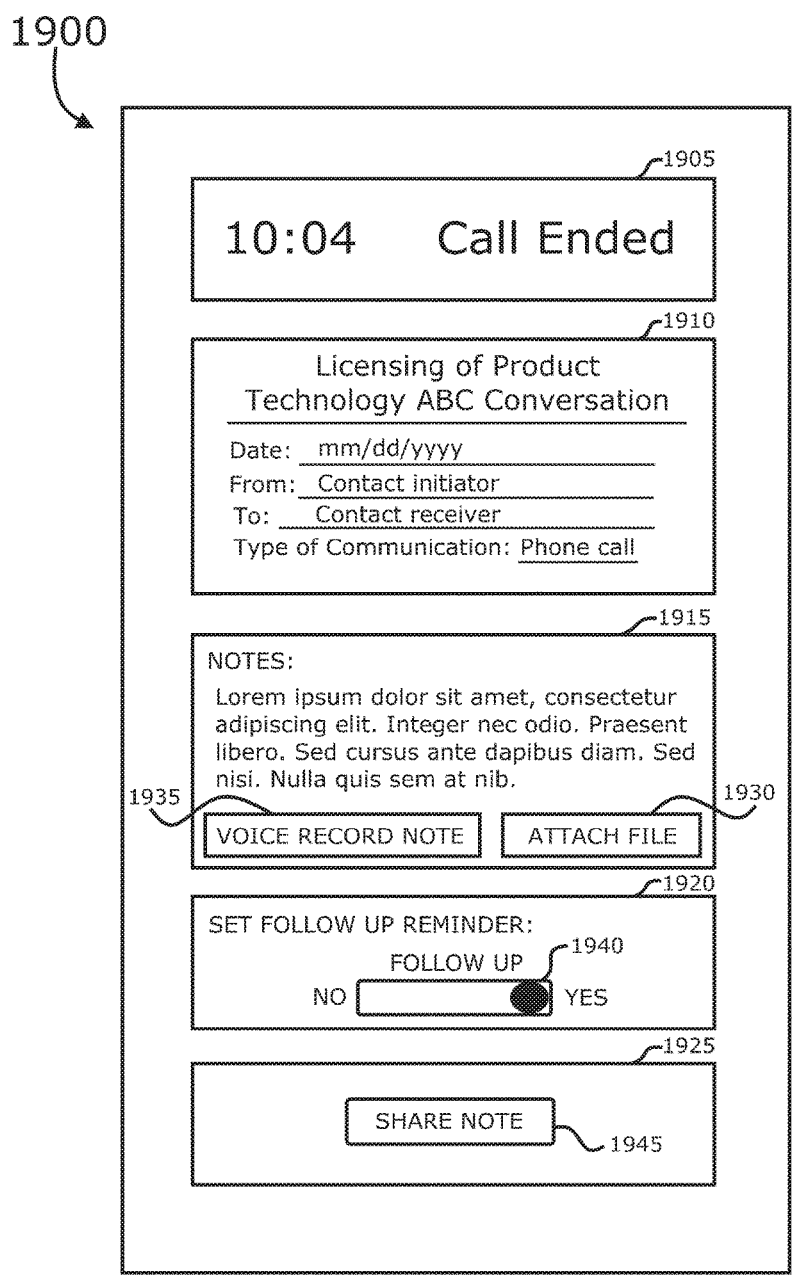

FIG. 19 conceptually illustrates a user interface to add a conversation log entry.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

As noted above, with the advent of mobile phones and social networking, many people (hereinafter referred to in the singular as a "user" and in the plural as "users") who use computing devices (e.g., mobile computing devices such as tablets or smartphones, standard computing devices such as desktop computers or laptop computers, etc.) do not have convenient ways to exchange personal information (such as contact information, calendar information, task and project information, etc.) electronically in the spirit of the internet with other users. For instance, when a first user of a mobile device encounters a second user of a mobile device, the first user and second user may wish to exchange contact information, but without a convenient electronic manner of exchanging such information, one or both of the first user and the second user are left to manually input the other user's contact information into their respective mobile device. This manual process is generally prone to user error and is often slower than an electronic exchange of information. Adding to this difficulty is the fact that a user might have contact information and other bulk information (e.g., task information, project information, calendar-related information, etc.) in relation to every contact that user knows, and periodically that user may encounter situations in which he or she would like to share a variety of personal information related to several contacts (or even all contacts the user knows). The user may also want to share personal information in a consistent and secure way between various platforms and applications that use this information. Naturally, many users of computing devices find this to be a problem. Embodiments of the invention described in this disclosure solve such problems by way of a novel information exchanging system and a plurality of novel information exchanging processes that facilitate personal information exchange between users of digital electronic devices.

In some embodiments, the information exchanging system includes a first computing device with a first near field communication system and a second computing device with a second near field communication system. In some embodiments, the information exchanging system facilitates the exchange of personal information between users of the first computing device and the second computing device when the first near field communication system is communicatively coupled to the second near field communication system.

In some embodiments, the information exchanging system includes coordinating software, which is described in further detail below. The coordinating software may take the form of one or more computer programs or software applications (hereinafter referred to as "application" or "software application"). In some cases, an application is configured to run on a particular computing device and may be downloaded from an application store onto the respective computing device. In some embodiments, personal and/or contact information can be stored in a memory or data storage unit of the computing device independent of the application, in a plurality of other applications, or elsewhere in memory or data storage. For example, contact information associated with the first computing device can be exchanged with the second computing device upon a successful near field communication or other communication connection between the first computing device and the second computing device. Alternatively, or in conjunction with exchanging contact information, the contact information on the first computing device can be compared to and/or synchronized with the contact information on the second computing device to determine mutually known contacts. In some cases, a user of the first computing device who receives a request from the application running on the second computing device can either push information to the second computing device or not, depending on the user's preferences.

In some embodiments, if two computing devices cannot pair together, for example because of a physical obstacle, the users in proximity would need to be determined from GPS and then paired and shared through other means, such as by an Internet connection. Thus, in some embodiments, the information exchanging system includes a web server computing device that is communicatively coupled to the first computing device and the second computing device. In some embodiments, the web server computing device includes a processor, a database, and an information exchanging program. In some embodiments, when the information exchanging program is running on the processor, the web server computing device is configured to receive personal information from the first computing device and the second computing device and to store the received personal information in the database. Once the devices are linked, the near field communication between the first computing device and the second computing device results in sharing the required information in the database.

In this specification, there are several descriptions of methods and processes that are implemented as software applications and run on computing devices to perform the steps of the methods and/or processes. However, it should be noted that for the purposes of the embodiments described in this specification, the word "method" is used interchangeably with the word "process". Methods or processes for exchanging information by way of an information exchanging system are described, therefore, by reference to several example methods and processes that conceptually illustrate process steps for exchanging information between devices through an information exchanging system.

Several more detailed embodiments are described in the sections below. Section I describes an information exchanging system. Section II describes several processes for exchanging information between devices by way of an information exchanging system. Section III describes a network architecture of an information exchanging system. Section IV describes some information exchanging system account and contact processes. Section V describes several organization relation processes. Section VI describes conversation log entry and update process. Section VII describes a contact mapping process. Section VIII describes an electronic system that implements some embodiments of the invention. Section IX describes examples of manual processes and example user interfaces of software implementations of one or more of the processes.

I. Information Exchanging System

By way of example, FIG. 1 conceptually illustrates an architecture of an information exchanging system 100 that facilitates personal information exchange between users of digital electronic devices. As shown in this figure, the information exchanging system 100 facilitates electronic information exchange between computing devices that have an application 22 (e.g., "IKOSDEX" as it may be called in some embodiments) installed which is associated with the information exchanging system 100. The computing devices shown in this example include a set of hand-held mobile computing devices 10, a set of laptop computers 12, and a set of tablet computing devices 14. A first set of proximate devices 18 is shown by a dashed line box that surrounds one of the mobile computing devices 10, one of the laptop computers 12, and one of the tablet computing devices 14. Similarly, a second set of proximate devices 20 is shown by a dashed line box that surrounds another one of the mobile computing devices 10, another one of the laptop computers 12, and another one of the tablet computing devices 14. In this example, each of the computing devices within the first set of proximate devices 18 is in close enough physical proximity to be able to make a successful near field communication connection with one or more of the other computing devices in the first set of proximate devices 18. Likewise, each of the computing devices within the second set of proximate devices 20 is in close enough physical proximity to be able to make a successful near field communication connection with one or more of the other computing devices in the second set of proximate devices 20.

Each of the hand-held mobile computing devices 10, laptop computers 12, and tablet computing devices 14 includes the software application 22 installed. In some embodiments, the software application 22, when running on the respective computing device on which it is installed, includes a set of structured tools and resources for interacting with the information exchanging system 100 and/or any one or more of the other computing devices (including computing devices that are not physically close enough to establish a near field communication connection). The set of structured tools and resources of the software application 22 may include, without limitation, a default directory (e.g., a default address book where the user has organized known contacts into multiple address books, such as personal contacts, work contacts, professional contacts, etc.), a profile history, application settings, profile settings, and a search tool (e.g., a tool to search the database for contacts that may not be in proximity).

By way of example, when two or more of the computing devices are used in close proximity of each other, in some instances, the users of the computing devices may wish to exchange personal information. Thus, a user of mobile computing device 10 and a user of laptop computer 12 in the first set of proximate devices 18 may establish a near field communication connection and exchange information as desired. In another example, however, the user of the mobile device 10 in the first set of proximate devices may not be in close enough physical proximity to a user of any computing device (e.g., the mobile device 10, the laptop 12, and tablet 14) in the second set of proximate devices 20. In this example, the exchange of the personal information is facilitated by the information exchanging system 100, which further includes a web server 24 that is accessible by each computing device (i.e., the mobile computing device 10 in the first set of proximate devices 18 and any of the computing devices in the second set of proximate devices 20) over the Internet (e.g., a "cloud" service for exchanging personal information).

While FIG. 1 provides a conceptual illustration of an example architecture of the information exchanging system 100, a person skilled in the relevant art would appreciate that there are more details involved in connected two or more computing devices in a way that allows them to exchange personal information. For example, one of the mobile computing devices 10 may be a first computing device associated with a first user. The first computing device may include a first near field communication system. Additionally, one of the tablet computing devices 14 may be a second computing device associated with a second user, and the second computing device may be outfit with a second near field communication system. When the first user and the second user wish to exchange personal electronic information and are in proximity of each other, the first near field communication system of the first computing device may then become communicatively coupled to the second near field communication system of the second computing device. Furthermore, the web server 24 may present to which each of the first computing device and the second computing device becomes communicatively coupled, regardless of whether or not they establish a near field communication connection. When the web server 24 provides the cloud service for exchanging personal information between two or more computing devices with the software application 22 installed, then the first computing device and/or the second computing device may provide the electronic personal information intended to be exchanged with the other computing device. The web server 24 may be configured to receive such electronic personal information from each of the first second computing devices, and may then store the received data in a database.

In some cases, a near field communication connection between the devices is needed in order to exchange the information. For example, the web server 24 may only receive the required electronic personal information from the first and second computing devices when an electronic "handshake" connection between the first near field communication system and the second near field communication system is successful. In some cases, a successful "handshake" connection is contingent upon establishing a near field wireless communication connection between the first and second near field communication systems and upon express approval of the first and second users of the first and second computing devices, respectively. When the "handshake" connection is established and successful, the required electronic personal information is shared between the first computing device and the second computing device. In some embodiments, the required electronic personal information is also shared through the cloud service by way of the web server 24 and the database.

In this specification, near field communication includes NFC, Bluetooth and other communication technologies or protocols used in communication when devices are contacted physically (e.g., touching smartphones together to transfer personal information via NFC) and/or in close physical proximity (e.g., using Bluetooth to transfer information to a nearby device). Additionally, in this specification, there are several descriptions of methods and processes that are performed in connection with exchanging electronic information between computing devices. However, it should be noted that for the purposes of the embodiments described in this specification, the word "method" is used interchangeably with the word "process". Methods performed by the information exchanging system and/or software running on a user's computing device while accessing and interacting with the information exchanging system are described, therefore, by reference to several example processes that conceptually illustrate process steps for establishing near field communication connection and exchanging information between two or more computing devices and/or facilitating information exchange between computing devices.

II. Processes for Exchanging Information Between Devices

By way of example, FIG. 2 conceptually illustrates corresponding processes 200 and 250 for exchanging information between two devices. In this example, two users (i.e., "USER 1" and "USER 2") are in close proximity with each other and "USER 1" would like to exchange contact information with "USER 2". As shown in this figure, the process 200 starts when "USER 1" chooses to share (at 205) information. For example, "USER 1" may launch an application on a mobile device and select a tool from a graphical user interface (GUI) to share contact information. Next, the process 200 receives a selection of a contact (at 210) whom "USER 1" wishes to exchange the contact information. In this example, "USER 1" has selected to share contact information with "USER 2". The process 200 then receives a selection to make a request to exchange contact information (at 215) with "USER 2".

Turning to the process 250, when "USER 2" is running the application to share information (at 255), the request to exchange information from "USER 1" is received at the device. Next, the process 250 receives a selection from "USER 2" to accept (at 260) the request to exchange contact information.

After "USER 1" selects "USER 2" as the contact to exchange the contact information the process 200 attempts to pair (at 220) the computing device of "USER 1" with the computing device of "USER 2" using near field communication (NFC). Contemporaneously with process 200 pair the device using NFC, the process 250 also attempts to pair (at 265) the computing device of "USER 2" with the computing device of "USER 1".

Once the NFC connection pairs the computing device of "USER 1" and the computing device of "USER 2", the process 200 sends (at 225) the contact information of "USER 1" to the computing device of "USER 2". Likewise, the process 250 sends (at 270) the contact information of "USER 2" to the computing device of "USER 1".

Next, the process 200 adds (at 230) contact information from "USER 2" to the computing device of "USER 1", and the process 250 adds (at 275) contact information from "USER 1" to the computing device of "USER 2". Finally, the process 200 adds (at 235) a notification to "USER 1" contact history, and process 250 adds (at 280) a notification to "USER 2" contact history. While the near field communication system used in this example is NFC, a person skilled in the art would appreciate that another type of near field communication system could be used in the alternative, such as Bluetooth, without changing the steps of the process 200.

Turning to another example, FIG. 3 conceptually illustrates a process 300 for using an information exchanging system. The process 300 for using an information exchanging system may be implemented as an information exchanging software application that runs on at least one processing unit of a computing device or as a mobile information exchanging app that runs on at least one mobile processor of a mobile computing device.

In some embodiments, a user will access the information exchanging system over a network, such as a wireless network, the Internet (the "cloud"), or another network. In some embodiments, the process 300 starts when the user attempts to login or generate an account. At that point, the process 300 creates and authenticates (at 305) the account. Next, the process 300 adds (at 310) address book and contact information. In some embodiments, the process 300 recognizes that existing contact information is already available, so the process 300 then updates (at 315) the contact information. For instance, the user has changed mobile phone devices and now has a new telephone number which the process 300 recognizes as a field to update and share with all of the shared contacts. Upon the contact being updated (at 320), the process 300 then synchronizes (at 325) with shared contacts. Thus, for example, if the user has a new phone number, all of the shared contacts would get the updated telephone number synchronized to their own address books.

Referring back to the process 300 adding the address book and contact information (at 310), in some embodiments, the process 300 then shares (at 330) the contact information based on privacy settings. In some embodiments, one or more of three options to continue exist. During a first option, the process 300 adds (at 335) an appointment and then performs scheduling (at 340) with selected shared contacts. The process 300 then shares (at 365) the contact information based on privacy settings. During a second option, the process adds (at 345) a task and then assigns the task (at 350) with selected shared contacts. The process 300 then shares (at 365) the contact information based on privacy settings. During a third option, the process 300 adds (at 355) a memo and then shares the memo (at 360) with selected shared contacts. The process 300 then shares (at 365) the contact information based on privacy settings. In some embodiments, the process 300 identifies the contacts in the shared task. As such, a mutual contact can add a task with multiple contacts, for example, and each recipient can uniquely identify the others (e.g., a name may simply be displayed) and start the process to sync contact profiles. In some embodiments, the process 300 also may have the option to share contact information from a list of mutual contacts created from shared productivity.

Although the process 200, described above by reference to FIG. 2, provides a high-level overview of how a user might request a connection with another device of another user in order to exchange personal information, FIG. 4 conceptually illustrates a process 400 for requesting information exchange. The process 400 may be performed by a software application with a user interacting with the software. For example, a user may have IKOSDEX installed on a mobile computing device and may interact with a graphical user interface (GUI) of the IKOSDEX application in order to exchange information with another user of the application.

In some embodiments, the process 400 receives a user selection to share (at 405) contact information. The process 400 then receives a selection (at 410) of a user profile. In particular, a user can have multiple contact profiles (e.g., work, charity, friends, neighbors, etc.) and may first choose one of the contact profiles to share with another user. For example, a first user wishes to share "work" contact profile contact information with a second user, so the first user selects the "work" contact profile to share with the second user. Next, the process 400 performs any one of four operations that can be selected by the user.

During a first option, the process 400 performs a proximity search (at 415). For instance, the process may use NFC, QR code, Bluetooth, geolocation, i-beacon, or other mechanisms for identifying others in close proximity to the mobile device of the user.

During a second option, the process 400 performs shared productivity type operations (at 420). For example, the process may update calendars, tasks, memos, etc., with existing contacts. During a third option, the process 400 performs a database search (at 425). In a fourth option, the process 400 makes a contact referral (at 430).

When the user completes one or more of the four options outlined above, the process 400 then determines (at 435) whether any contacts were found. If no contact was found, the process 400 ends. On the other hand, when one or more contacts are found, the process 400 of some embodiments receives a selection of a target contact (at 440). The process 400 then determines (at 445) whether acceptance from the target contact is required or not. When acceptance is required, the process 400 of some embodiments sends, to the contact, a request (at 450) to exchange contact information. Then the process 400 transitions to 455 to determine whether there is a user response. In some embodiments, if the target user does not respond immediately, the request is placed in a list of requests until an action is taken. On the other hand, when the request is denied, the process 400 sends rejection notifications (at 460). Then the process 400 ends. On the other hand, when there is an acceptance user response, the process 400 of some embodiments receives selection of an address book, which is described in further detail below.

Referring back to the decision at 445, when acceptance from the target contact is not required, the process 400 of some embodiments receives a selection (at 465) of an address book. Next, the process 400 adds (at 470) the target contact information (e.g., "USER 2" information) to the address book on the mobile device of the user interacting with the information exchanging system. The process 400 also updates the address books of the devices of the users. After adding/updating the contact information, the process 400 then adds (at 475) notification to the user's contact history profile. Then the process 400 ends.

Assuming the other user wishes to exchange personal information, FIG. 5 conceptually illustrates a process 500 for accepting an information exchange request. The process 500 may be performed by the software application running on the target contact's mobile device. In some embodiments, the process 500 starts when the user decides to share contact (at 510) information. The process 500 receives initiation of a contact exchange (at 520). For instance, a request to exchange contact information is received on the mobile device of USER 2 from the mobile device of USER 1.

Next, the process 500 determines (at 530) whether acceptance is required. When acceptance is not required, the process 500 transitions to 560 to selecting an address book, which is described in greater detail below. On the other hand, when acceptance is required, the process 500 then determines (at 540) whether to send an acceptance of the request or not. When the request to exchange contact information is not accepted, the process 500 responds to the request with a rejection notification (at 550). Then the process 500 ends.

On the other hand, when the request to exchange contact information is accepted, the process 500 receives selection of an address book (at 560). The process 500 uses the selected address book to then add (at 570) the received contact information of the other user to the contact list on the mobile device of the present user. Alternatively, or in conjunction with adding the contact information, the process of some embodiments may update the address books of the users. After adding/updating the user's contact information, the process 500 then adds (at 580) notification to the contact history profile of the user. The process 500 then ends.

If or after personal information, such as contact information, has been exchanged between computing devices, the information can be updated. By way of example, FIG. 6 conceptually illustrates a process 600 for updating contact information associated with contact information received during an exchange of information. The process 600 for updating contact information associated with contact information received during an exchange of information may be implemented as an information exchanging software application that runs on at least one processing unit of a computing device or as a mobile information exchanging app that runs on at least one mobile processor of a mobile computing device.

In some embodiments, the process 600 begins when it receives (at 610) a user profile to update. The process 600 then applies (at 620) the contact data update to the user profile selected for update. The process 600 then determines (at 630) whether the contact profile has been updated. When the contact profile has been updated, the process 600 ends.

On the other hand, if not adding a new contact, the process 600 synchronizes (at 640) the user address book and address book of shared contacts. After the contacts are mapped to each others' address books, the process 600 may see whether the user is updating their own profile and synchronize any such update with all shared contact. Then the process 600 updates contact history data (at 650) and adds notifications (at 660). Then the process 600 ends.

III. Network Architecture of an Information Exchanging System

FIG. 7 conceptually illustrates a network architecture of an information exchanging system 700 in some embodiments. Similar to the system architecture described by reference to FIG. 1, the information exchanging system 700 of FIG. 7 includes a set of mobile computing devices 10, a laptop computer 12, and a tablet computer 14. These computing devices, along with a desktop computer 16, a camera, a watch, and a browser connect with other devices via NFC, Bluetooth, i-beacon, NFC tag, QR tag, wireless or wired Internet connection, and other data communication mechanisms in order to exchange personal information between two or more devices. The cloud service also facilitates the exchange of such information once connection is established and permission to exchange contact information is authorized.

Persons of ordinary skill in the art may appreciate that numerous design configurations may be possible to enjoy the functional benefits of the information exchanging system 700. Thus, given the wide variety of configurations and arrangements of embodiments of the information exchanging system, the scope of the information exchanging system is reflected by the breadth of the claims rather than narrowed by the embodiments and examples described above.

Further embodiments and examples are described in the next section. Specifically, several additional processes are detailed and described by reference to FIGS. 8-15.

IV. Information Exchanging System Account and Contact Processes

By way of example, FIG. 8 conceptually illustrates a process for creating and authenticating individual and organization accounts 800 in an information exchanging system. The process for creating and authenticating individual and organization accounts 800 may be implemented as an information exchanging software application that runs on at least one processing unit of a computing device or as a mobile information exchanging app that runs on at least one mobile processor of a mobile computing device.

As shown in this figure, the process for creating and authenticating individual and organization accounts 800 starts by receiving (at 810) account credentials to create a new account. For example, the process 800 may receive username and password, or may receive an access key/token, or both (username/password and an access key or token). When the account credentials are received, the process for creating and authenticating individual and organization accounts 800 creates (at 820) a new system account based on the received account credentials. For example, the process 800 may access an administrative module of an information exchanging system to create the new system account, using the received account credentials, which are thereafter stored securely (encrypted) in a database communicably connected to the information exchanging system.

In some embodiments, the process for creating and authenticating individual and organization accounts 800 determines (at 830) whether the new system account is for an organization. When the new system account is affirmatively for an organization, the process for creating and authenticating individual and organization accounts 800 adds (at 840) the organization profile contact information to the new system account. Next, the process for creating and authenticating individual and organization accounts 800 creates and assigns (at 850) a master administrator user account (individual). However, when the process for creating and authenticating individual and organization accounts 800 negatively determines (at 830) that the new system account is not for an organization, the process 800 then adds (at 860) an individual's user account with permission to administer the organization to the new system account.

In some embodiments, the process for creating and authenticating individual and organization accounts 800 initializes (at 870) an end user session. Then, having created and authenticated a new system account, the process for creating and authenticating individual and organization accounts 800 ends.

In another example, FIG. 9 conceptually illustrates a process for adding, switching, and removing contact profiles 900 that were previously shared with other users of an information exchanging system. The process for adding, switching, and removing contact profiles 900 may be implemented as an information exchanging software application that runs on at least one processing unit of a computing device or as a mobile information exchanging app that runs on at least one mobile processor of a mobile computing device. Typically, a user (or rather, an individual) is sharing multiple contact profiles with other users of the information exchanging system. From time to time, the user may wish to add another contact profile to the several contact profiles already created or remove a particular contact profile (so that it no longer is present in the information exchanging system). Alternatively, the user may simply wish to switch from one contact profile to another contact profile among the several contact profiles already present.

The process for adding, switching, and removing contact profiles 900 of some embodiments starts by receiving (at 905) a selection of a shared target contact. In some embodiments, the process for adding, switching, and removing contact profiles 900 receives (at 910) selection of a shared contact management tool. In some embodiments, each information exchanging system includes a plurality of shared contact management tools. In some embodiments, the plurality of shared contact management tools comprises a remove contact tool, a switch contact profile tool, and a delete contact tool that deletes a contact profile from an address book.

In some embodiments, the process for adding, switching, and removing contact profiles 900 determines (at 915) whether the remove contact tool was selected. When the remove contact tool was selected, the process for adding, switching, and removing contact profiles 900 removes contact synchronization (at 925), which is described in more detail below. On the other hand, when the remove contact tool was not selected, the process for adding, switching, and removing contact profiles 900 then determines (at 920) whether the switch contact profile tool was selected. When the switch contact profile tool was selected, the process for adding, switching, and removing contact profiles 900 switches (at 930) the contact profile. Then the process for adding, switching, and removing contact profiles 900 transitions to a step for sending (at 950) notification of a contact update, which is further described below.

On the other hand, when the switch contact profile tool was not selected, the process for adding, switching, and removing contact profiles 900 adds (at 935) the contact profile. Then the process for adding, switching, and removing contact profiles 900 transitions to a step for sending (at 950) notification of a contact update, which is further described below.

Turning back to the determination (at 915) of whether the remove contact tool was selected, when the process for adding, switching, and removing contact profiles 900 affirmatively determines that the remove contact tool was selected, then the process 900 removes contact synchronization (at 925), and then determines (at 940) whether to delete the contact from the address book. In some embodiments, the shared contact selection is only being revoked—not removed—from the contact profile of the user. On the other hand, when the process for adding, switching, and removing contact profiles 900 determines (at 940) that the contact should not be deleted, then the process 900 sends notification (at 950) of the contact update. In some embodiments, the process for adding, switching, and removing contact profiles 900 then ends.

V. Organization Relation Processes

In some embodiments, an account established in an information exchanging system can relate to other established accounts. For instance, a particular individual account can relate to an organization account when a contact directory of the organization includes a contact profile of the particular individual. Similarly, a particular organization account can relate to another organization account when the contact directory of the organization includes an organization contact profile of the particular organization. In some embodiments, an individual requests to join an organization directory to establish an individual to organization relation. In some embodiments, an organization requests an individual to join an organization directory to establish an organization to individual relation. When an individual to organization relationship or an organization to individual relationship is established, an organization of contact information occurs that enhances the value of the contact information. For instance, a consumer of contact information in which there is a relationship between an individual and an organization would view the relationship and understand that the contact information is verified by the organization when interacting with the individual. Also, the individual to organization relationship and organization to individual relationship only differ by which entity (individual or organization) initiates the relation. As such, a consumer of the contact information would not know (or care) who initiated the relation, but instead, would only see that the contact information of the individual is verified by the organization, thereby enhancing the confidence the consumer may have in the individual associated with the contact information.

In addition to such individual to organization and organization to individual relationships, other types of relationships can be established, such as an organization to organization relationship. In some embodiments, a first organization requests to join an organization directory of a second organization to establish an organization to organization relation. The following descriptions of processes further demonstrate how organization relations are established by way of an information exchanging system.

By way of example, FIG. 10 conceptually illustrates an individual to organization relation process 1000 for requesting to join an organization's directory by a requesting individual. The individual to organization relation process 1000 for requesting to join an organization's directory by a requesting individual may be implemented as an information exchanging software application that runs on at least one processing unit of a computing device or as a mobile information exchanging app that runs on at least one mobile processor of a mobile computing device.

In some embodiments, the individual to organization relation process 1000 starts by receiving (at 1005) a selection of a particular contact profile associated with an individual. For example, the individual selects the particular contact profile from among several of the individual's own contact profiles. Next, the individual to organization relation process 1000 receives (at 1010) an organization search query with search criteria aimed at identifying a particular organization to relate to the individual. After the search criteria is received, the individual to organization relation process 1000 of some embodiments performs (at 1015) the organization search query. When the search query is completed, the individual to organization relation process 1000 receives (at 1020) search results of organizations identified during the search. For example, the search results may include several organizations with accounts established on an information exchanging system. As such, the individual to organization relation process 1000 visually outputs (at 1025) the search results. For example, a list of the organizations found during the search may be visually output onto a display screen of a computing device used by the individual.

After the organization search steps are completed, further interactions with the individual are performed so as to determine with which organization the individual wishes to establish a relation. In some embodiments, the individual to organization relation process 1000 receives (at 1030) a selection of a target organization in the search results. For example, the individual may select the particular organization from the list of visually output search results and upon visually verifying that the particular organization is the intended organization, use the particular selected organization as the target organization.

After the selected target organization is received, the individual to organization relation process 1000 of some embodiments determines (at 1035) whether the particular contact profile of the individual presently exists in a directory of contacts for the target organization. When the particular contact profile of the individual is determined to exist in the directory of the target organization, then the individual to organization relation process 1000 ends. On the other hand, when the particular contact profile of the individual does not exist in the directory of the target organization, then the individual to organization relation process 1000 determines (at 1040) whether joining the directory of the target organization by the individual requires acceptance from the target organization.

In some embodiments, when acceptance from the target organization is not required to join the directory of contacts of the target organization, then the individual to organization relation process 1000 adds (at 1060) the particular contact profile associated with the individual to the directory of contacts of the target organization. The individual to organization relation process 1000 then proceeds as further described below. However, when affirmative acceptance from the target organization is required to join the directory of contacts of the target organization, then the individual to organization relation process 1000 sends (at 1045) a request to join the directory of the target organization. The request to join includes a request to exchange contact information.

After sending the request to join the target organization's directory and exchange contact information, the individual to organization relation process 1000 determines (at 1050) whether the request is accepted by the target organization. For example, an administrator of the organization accepts or rejects the request to join and exchange on behalf of the organization. When the request to join and exchange is rejected by the target organization, then the individual to organization relation process 1000 sends (at 1055) a rejection notification to the individual, after which the individual to organization relation process 1000 ends. In contrast, when the request to join and exchange is authorized, then the individual to organization relation process 1000 adds (at 1060) the particular contact profile associated with the individual to the directory of contacts of the target organization. In some embodiments, the organization to individual relation process 1000 includes manually addition of the contact information for the particular contact profile being added to the directory of contacts of the target organization. For example, manual data entry may be performed by an administrator (or another authorized end user) associated with the organization to add contact information about the individual.

After adding the particular contact profile of the individual to the directory of the target organization, the individual to organization relation process 1000 of some embodiments adds (at 1065) the profile of the target organization to the individual's particular contact profile directory. In this way, the individual would be able to exchange the particular contact profile with other users, and the organization would retain certain authorizations with respect to the organization contact information now associated with the individual's particular contact profile. For example, the organization contact profile may include organization information such as an office address which would be prepopulated for the particular contact profile at the time the request to join and exchange was accepted by the organization, but could be updated in the future by the organization in the event that the office address changes.

Next, the individual to organization relation process 1000 sends (at 1070) acceptance notifications to the individual and the target organization. In some embodiments, the individual to organization relation process 1000 then ends.

Turning to another example, FIG. 11 conceptually illustrates an organization to individual relation process 1100 for requesting an individual to join an organization's directory as requested by the organization. The organization to individual relation process 1100 for requesting an individual to join an organization's directory as requested by the organization may be implemented as an information exchanging software application that runs on at least one processing unit of a computing device or as a mobile information exchanging app that runs on at least one mobile processor of a mobile computing device. An administrator acting on behalf of the organization may interact with the information exchanging software application to initiate an exchange of contact information with a target individual.

In some embodiments, the organization to individual relation process 1100 starts by receiving (at 1105) a selection of an organization contact profile. The organization contact profile is selected from possibly several organization contact profiles associated with the organization which is requesting the individual to exchange contact information and join its directory. Next, the organization to individual relation process 1100 receives (at 1110) a contact search query with search criteria aimed at identifying a particular contact. The organization to individual relation process 1100 then performs the organization search query (at 1115) and determines (at 1120) whether the particular contact was found during the search.

When the particular contact is not found during the search, the organization to individual relation process 1100 adds (at 1125) contact information manually for adding the particular contact to the directory of the organization contact profile, and thereby establishes an organization to individual relation. For example, manual data entry may be performed by an administrator (or other authorized end user) associated with the organization to add contact information about the individual. Then the organization to individual relation process 1100 ends.

On the other hand, when the particular contact is found during the search, then the organization to individual relation process 1100 determines (at 1130) whether the contact exists in the directory of the organization contact profile. When the contact presently exists in the directory of the organization contact profile, the organization to individual relation process 1100 ends. However, when the contact does not presently exist in the directory of the organization contact profile, then the organization to individual relation process 1100 determines (at 1135) whether adding the contact to the directory of the organization contact profile requires permission by the contact.

When permission by the contact is not required to add the contact to the directory of the organization contact profile, then the organization to individual relation process 1100 adds (at 1155) the contact profile to the directory of the organization contact profile. The organization to individual relation process 1100 thereafter proceeds, as is further detailed below.

However, when permission by the contact is affirmatively required to add the contact to the directory of the organization, then the organization to individual relation process 1100 sends (at 1140) a request to the individual for authorization to exchange information and add the contact profile of the individual to the directory of the organization. The organization to individual relation process 1100 then determines (at 1145) whether the individual (contact) has accepted the invitation and authorized the organization to exchange information and add the contact profile of the individual to the directory of the organization. When the individual has not authorized the organization to exchange information and join the directory of the organization, the organization to individual relation process 1100 sends (at 1150) rejection notifications to the individual and to the organization. In some embodiments, after sending rejection notifications, the organization to individual relation process 1100 ends.

On the other hand, when the individual has affirmatively accepted the request (or invitation) for permission to exchange information and join the directory of the organization, then the organization to individual relation process 1100 adds (at 1155) the contact profile to the directory of the organization. After adding the contact profile to the directory of the organization, the organization to individual relation process 1100 adds (at 1160) the organization contact profile to the contact profile of the individual. Then the organization to individual relation process 1100 sends (at 1165) acceptance notifications to the individual and the target organization. After sending the acceptance notifications, the organization to individual relation process 1100 ends.

Now rounding out the organization relation process examples, FIG. 12 conceptually illustrates an organization to organization relation process 1200 for joining an organization's directory by another organization. The organization to organization relation process 1200 for joining an organization's directory by another organization may be implemented as an information exchanging software application that runs on at least one processing unit of a computing device or as a mobile information exchanging app that runs on at least one mobile processor of a mobile computing device. Administrators or other authorized end users of the respective organizations may interact with the information exchanging software application or the mobile information exchanging app to provide user input in relation to various steps of the organization to organization process 1200.

As shown in this figure, the organization to organization relation process 1200 starts by receiving (at 1205) selection of a particular organization profile. Next, the organization to organization relation process 1200 receives (at 1210) a target organization search query with search criteria aimed at identifying a target organization to relate to the particular organization. The organization to organization relation process 1200 then performs (at 1215) the target organization search query and receives (at 1220) search results including target organizations identified during the search based on the target search query. After the search is completed and the search results are received, the organization to organization relation process 1200 visually outputs (at 1225) the search results on a display screen of a computing device for an operator of the computing device to make a selection. For example, an administrator of the organization may view the results in a graphical user interface (GUI) of the information exchanging software application running on a desktop computer. Thus, when the operator of the computing device makes a selection from the search results visually output on the display screen, then the organization to organization relation process 1200 receives (at 1230) the selection of an organization, namely, a selection of a specific target organization from the search results. For example, an organization might first have a customer service department of tellers and a related broker organization.

In some embodiments, the organization to organization relation process 1200 determines (at 1235) whether the particular organization is in the global directory of the specific target organization. When the particular organization is affirmatively present the global directory of the specific target organization, then the organization to organization relation process 1200 ends. However, when the particular organization is not in the directory of the specific target organization, then the organization to organization relation process 1200 determines (at 1240) whether permission is required to join the directory of the specific target organization.

When permission is not required, the organization to organization relation process 1200 adds (at 1260) the particular organization profile to the specific target organization directory. Then the organization to organization relation process 1200 proceeds, as is further described below. On the other hand, when permission is required, then the organization to organization relation process 1200 sends (at 1245) a request for permission to exchange information and join the specific target organization directory. In some embodiments, the organization to organization relation process 1200 determines (at 1250) whether the request for permission to exchange information and join is permitted. When the request for permission to exchange information and join is not authorized, then the organization to organization relation process 1200 sends (at 1255) a rejection notification to the particular organization that the request for permission to exchange information and join the directory of the specific target organization was not authorized. However, when the request for permission to exchange information and join is authorized, then the organization to organization relation process 1200 adds (at 1260) the particular organization profile to the directory of the specific target organization. After adding the particular organization to the directory, the organization to organization relation process 1200 of some embodiments adds (at 1265) the specific target organization profile to the directory of the particular organization. Then the organization to organization relation process 1200 sends (at 1270) acceptance notifications to the particular organization and the specific target organization. Then the organization to organization relation process 1200 ends.

VI. Conversation Log Entry

In some embodiments, an account established in an information exchanging system can have many contacts and each contact can be associated with one or more conversation log entries for one or more conversations between the contact and another contact. The conversation log entries associated with conversations of a contact can be shared between contacts using an information exchanging system. Thus, the following processes include details for adding conversation log entries and for updating conversation log entries.

By way of example, FIG. 13 conceptually illustrates a process for adding a conversation log entry 1300. The process for adding a conversation log entry 1300 may be implemented as an information exchanging software application that runs on at least one processing unit of a computing device or as a mobile information exchanging app that runs on at least one mobile processor of a mobile computing device.

In some embodiments, the process for adding a conversation log entry 1300 starts by determining (at 1305) whether the conversation log entry is a live communication log entry. When the conversation log entry is not a live communication log entry, the process for adding a conversation log entry 1300 receives (at 1310) a selection of a type of communication. For example, the selected communication type may be a voicemail message, a conversation (e.g., face-to-face), a call log (e.g., phone conversation), a letter, etc. On the other hand, when the conversation log entry is a live communication log entry, the process for adding a conversation log entry 1300 receives (at 1315) a selection of a contact for live communication. Then the process for adding a conversation log entry 1300 starts (at 1320) the live communication event. After the live communication event is started, the process for adding a conversation log entry 1300 of some embodiments saves (at 1325) meta-data associated with the live communication. For example, the meta-data may include any information about the live communication event, such as, without limitation, the party from which the live communication was initiated, the party which the live communication is directed to, the date of the live communication, the start time of the live communication event, the type of communication engaged in for the live communication event (e.g., phone, video, chat, conference call, etc.), and other such details as pertaining to the live communication event. Next, the process for adding a conversation log entry 1300 of some embodiments completes the live communication event (at 1330). Then the process for adding a conversation log entry 1300 adds (at 1335) a live communication event entry, attaching the meta-data of the live communication and other data information.

In some embodiments, the process for adding a conversation log entry 1300 then visually outputs (at 1340) a communication log entry form. In some embodiments, the communication log entry form that is displayed is based on the type of communication. For example, a live communication log entry form may be different from a prior communication log entry form. Regardless of the type of communication or the form of the communication log entry, the process for adding a conversation log entry 1300 of some embodiments next adds (at 1345) communication notes about the conversation. For example, a user may enter text information or a telephone call my have a voice recording, while a video call may have a video saved to attach to the communication notes, along with additional notes as provided by the user.

Next, in some embodiments, the process for adding a conversation log entry 1300 determines (at 1350) whether to add to existing conversations of the communication log entry form for this conversation log entry. For example, a prior conversation may be relevant to the present conversation, as it may include notes that are needed for ongoing discussions, such as price quotes or prior offers or promises which now are playing out in the present conversation. When an existing conversation does not need to be added to the present conversation log entry, then the process for adding a conversation log entry 1300 sets (at 1365) a follow-up reminder in the conversation log entry. For example, a follow-up reminder may specify a time to follow-up and may include a type of communication to use in follow-up, a list of requirements that need to be discussed and/or provided for follow-up, a date for follow-up, etc. Additionally, the follow-up reminder could be set on the current conversation or retroactively on previous entries. The information exchanging system would then prompt or notify with an alert notification at the set time specified by the follow-up reminder. After setting the follow-up reminder, the process for adding a conversation log entry 1300 proceeds as described in further detail below.

Turning back to the determination (at 1350) of whether to add to existing conversations of the present conversation log entry, when the process for adding a conversation log entry 1300 determines that an existing conversation should be added, then the process for adding a conversation log entry 1300 receives (at 1355) s election of existing conversations. After selecting the existing conversation, the process for adding a conversation log entry 1300 chooses an entry within the conversation thread and adds (at 1360) the selected conversation to the present conversation log entry. For example, the user may choose an entry within the conversation thread, which is then linked to the present conversation log entry. In some embodiments, the information exchanging system creates a new conversation entry with meta data as described during a live event. However, the user is allowed, during the addition step, to file the conversation log entry in a specific conversation thread already saved rather than creating a new thread.

Next, the process for adding a conversation log entry 1300 sets (at 1365) a follow-up reminder in the present conversation log entry. In some embodiments, the process for adding a conversation log entry 1300 then determines (at 1370) whether to share communication notes of the present conversation log entry with another contact. When the communication notes of the present conversation log entry are not shared with another contact, then the process for adding a conversation log entry 1300 ends. On the other hand, when the communication notes of the present conversation log entry are shared with at least one other contact, then the process for adding a conversation log entry 1300 adds (at 1375) the communication notes to conversation log(s) of target or specified contact(s). Next, the process for adding a conversation log entry 1300 adds (at 1380) a notification to notification list(s) of target/specified contact (s). Then the process for adding a conversation log entry 1300 ends.

In some embodiments, an existing conversation log entry is updated. For example, a conversation log entry may already exist but needs to be updated with new notes, added details, etc., or a related contact who shares the same conversation has updated a conversation log entry and shared the update via the information exchanging system.

The following description of a process for updating a conversation log entry provides an example that demonstrates how a conversation log entry is updated in connection with an information exchanging system. Specifically, FIG. 14 conceptually illustrates a process for updating a conversation log entry 1400. The process for updating a conversation log entry 1400 may be implemented as an information exchanging software application that runs on at least one processing unit of a computing device or as a mobile information exchanging app that runs on at least one mobile processor of a mobile computing device.

As shown in this figure, the process for updating a conversation log entry 1400 begins by selection (at 1405) of a conversation with a contact. To do this, a user of the information exchanging system first identifies a contact with whom the user had previously communicated, and then selects an existing conversation of the previous communication. While there may be several conversations related to the identified contact, the user selects the conversation which is intended to be updated. However, the process for updating a conversation log entry 1400 could alternatively start with selection of a contact and navigation to an existing conversation. For example, it could start with a list of conversations, such as a recent conversation list, and then proceed to selection of the specific entry to update. In some embodiments, the process for updating a conversation log entry 1400 proceeds with a selection (at 1410) of a conversation log entry related to the selected conversation. The selected conversation may include several conversation log entries, organized by date of entry or organized in some other way that enables a user to identify a conversation log entry which the user intends to update. For example, a contact may send a user a file with information which the contact promised to deliver during a live communication with the user, and upon receiving the file from the contact, the user may need to attach the file to an existing conversation log entry that was previously added to the conversation after the live communication occurred, thereby updating the existing conversation log entry.

In some embodiments, the process for updating a conversation log entry 1400 determines (at 1415) whether to initiate a conversation reply. In some cases, the existing conversation log entry will be updated in relation to a conversation reply, which typically includes one or more types of communication (e.g., phone, email, etc.). So if a live communication event is initiated from an existing conversation log entry, then a new communication log entry with meta-data is created within the selected conversation thread. Otherwise, the user has a chance to manually file the log entry in a specific thread when saving. However, in other cases, the existing conversation log entry will be updated in relation to existing communication information already present in the existing conversation entry. Thus, when a conversation reply is not initiated, the process for updating a conversation log entry 1400 determines (at 1430) whether to update the existing conversation log entry information or not. Then the process for updating a conversation log entry 1400 proceeds as described further below.

On the other hand, when the process for updating a conversation log entry 1400 determines (at 1415) that a conversation reply is affirmatively initiated, then the process for updating a conversation log entry 1400 starts (at 1420) the communication according to the specified form of communication. For example, the user may initiate an email reply to another contact, start a live phone call with the contact, communicate with the contact via a third party app, etc. Whatever the form of communication used to initiate the conversation reply, the process for updating a conversation log entry 1400 saves (at 1425) the communication information after the conversation reply is completed. The information saved includes communication information related to the type of communication, including, without limitation, date and time of reply, email subject and message text, length of phone conversation, third party app meta-data, etc.

After the conversation reply is completed and the communication information is saved, the process for updating a conversation log entry 1400 determines (at 1430) whether to update the existing conversation log entry information or not. In some cases, the user only intends to initiate a conversation reply with no intention of updating any other existing conversation log entry information. In some other cases, the user may initiate a conversation reply and update other existing conversation log entry information. In this way, the user is able to proactively update a conversation with intended replies to contacts which allow the conversation to continue naturally and as expected, while also updating conversation information retroactively to ensure that communication information previously entered is correct and complete. Therefore, when existing conversation log entry information is not updated, the process for updating a conversation log entry 1400 simply moves to the next step to determine (at 1440) whether to share the conversation log entry, which is described further below.

However, when existing conversation log entry information is intended to be updated, the process for updating a conversation log entry 1400 updates (at 1435) the conversation log entry. In some embodiments, the process for updating a conversation log entry 1400 updates the conversation log entry in response to user-initiated changes to communication information saved in relation to the conversation log entry. For example, the user may change a type of communication from "call log" to "voicemail" after realizing that the communication information was added to the conversation log in response to a voicemail the user received from another contact, as opposed to a call log of a live telephone conversation between the user and the contact. Substantive information can be changed, as well. For example, a price quote may be updated during a business valuation conversation.

After the conversation log entry is updated, or after the conversation reply is completed (with no other updated conversation log information), the process for updating a conversation log entry 1400 determines (at 1440) whether to share the conversation log entry. When the conversation log entry updates are not shared, then the process for updating a conversation log entry 1400 ends. In some embodiments, conversation log entry updates are not shared with any related contacts at all. For example, the user updated conversation log entry notes which are maintained privately with no shared access for contacts involved in the conversation or any other contacts.

By contrast, when the conversation log entry updates are shared, the process for updating a conversation log entry 1400 adds (at 1445) the updated conversation log entry to the conversation log(s) of one or more target contact(s), and proceeds to send (at 1450) notifications to the one or more target contact(s). Then the process for updating a conversation log entry 1400 ends.

When the conversation log entry updates are shared, the user can decide which target contact(s) will receive the updated conversation log entry information. In some embodiments, conversation log entry updates are shared with all contacts related to the conversation. For example, an outside contact may be involved in the conversation with the user and a supervisory contact may be supervising activities related to the conversation between the outside contact and the user, and both the outside contact and the supervisory contact are authenticated and authorized to view the updated conversation log information. In some embodiments, conversation log entry updates are selectively shared with one or more particular contacts related to the conversation and selected to receive an update notification. For example, the user who updated conversation entry details may select a particular contact to share the updated information with and/or inform by automated notification (e.g., email, SMS text message, etc.), but other contacts would not be authorized (or authenticated) to view the updated information or receive notifications of the updates. In some embodiments, conversation log entry updates are not shared with any related contacts by notification, but are available to contacts with permission to access the conversation log. For example, notifications of conversation updates are not sent to any contacts, but contacts with shared access to the conversation log may view the details of the communication notes, and therefore, may view the conversation log entry updates.

Thus, the information exchanging system provides users with enhanced ability share contact information, specifically by providing a platform to add, update, and share conversation log entries, as described above by reference to FIGS. 13 and 14. However, the information exchanging system goes beyond information sharing to provide effectual information that a user may employ in a real-world scenario. In particular, many users need to physically meet with contacts, or communicate with contacts via physical media (e.g., mail, package delivery, etc.), and therefore, need to obtain mapping directions to a location of a contact. For example, a user may travel to another city and wish to meet with nearby contacts in that city.

VII. Contact Mapping

The following description of a process for mapping directions to a contact provides an example that demonstrates how the information exchanging system can enable physical connection to contacts at locations associated with those contacts. Specifically, FIG. 15 conceptually illustrates a process for mapping directions to a contact 1500. The process for mapping directions to a contact 1500 may be implemented as an information exchanging software application that runs on at least one processing unit of a computing device or as a mobile information exchanging app that runs on at least one mobile processor of a mobile computing device. An end user (or "user") may interact with the information exchanging software application or mobile information exchanging app in order to identify and find contacts and map their locations.

As shown in this figure, the process for mapping directions to a contact 1500 starts by listing and sorting (at 1510) contacts by distance. In some embodiments, the process for mapping directions to a contact 1500 determines a location of the contact to navigate first. For example, the location of the contact to navigate could be a physical address or the person's current physical location as determined by GPS coordinates of the person's mobile device. When the user's location is known, such as an office address, the process for mapping directions to a contact 1500 identifies nearby contacts by radial calculation of a distance between an address in a contact profile and the location of the user. Then the process for mapping directions to a contact 1500 sorts and lists those contacts, with the nearest contacts appearing in a sorted order before farther contacts in the list.

In some cases, the user first refines the list of contacts to only include contact profiles that pertain to a specific category of contacts. For instance, the user may intend to meet with a particular contact to engage in a business transaction, and therefore, may only wish to list a business-related contact profile associated with the particular contact, and to exclude a personal contact profile associated with the particular contact. Such filtering of contact profiles is desirable to focus the list of contacts, and therefore, prevent mistakes in directions and ensure that directions proceed according to the intended activities or engagements with contacts. For example, the user may know a particular contact personally and may also engage in business with the particular contact, but if the user is invited to a party hosted by the particular contact at the home of the particular contact, then it is unlikely the user would want the business contact profile of the particular contact to be shown in the list of nearby contacts, as this could inadvertently be selected from the list for navigation to the address associated with the contact profile selected from the list. Also, when the user is navigating to a physical address that is shared, the user would easily be able to open the contact profile associated with the physical address and click on the address with a navigation tool to start real-time navigation to the contact's physical address. Alternatively, the user may refine the list of contacts to include contact profiles in a proximity search, such as that described above by reference to FIG. 4.

In some embodiments, the process for mapping directions to a contact 1500 receives (at 1520) a selection of a target contact. For example, the user may view the list of nearby contact and select a target contact with whom the user has a scheduled meeting at the target contact's location. Next, the process for mapping directions to a contact 1500 visually outputs (at 1530) a map with the location of the target contact. In some embodiments, the process for mapping directions to a contact 1500 then navigates (at 1540) to the location of the target contact with directions provided during navigation and as a list of turn-by-turn directions which the user can review to traverse a path to the location of the target contact with real-time navigation. Then the process for mapping directions to a contact 1500 ends. Thus, the process for mapping directions to a contact 1500 allows a user of the information exchanging system to identify nearby contacts no matter where the user is located, and to obtain physical location information and directions to the physical locations of nearby contacts.

An example of a user engaging the contact mapping features of the information exchanging system would be a parent looking for a lost child at an amusement park (or any other crowded and large open area). If both parent and child are carrying a mobile device and have set their location permissions to be visible, the real-time navigating could ensue for the parent to find the lost child, along the steps outlined in the process for mapping directions to a contact 1500 described above by reference to FIG. 15.

In addition, the process for mapping directions to a contact 1500 could be adapted in ways that enhance privacy while allowing for contacts to be mapped. For instance, a set of request/response steps could be added to the process for mapping directions to a contact 1500 to allow for limited authorization (e.g., one-time authorization) to determine another person's location and navigate to their location.

Another adaptation could allow the process for mapping directions to a contact 1500 to display a map with clusters of users broadcasting their location. Implementation of such steps in the process for mapping directions to a contact 1500 would be useful in emergency situations, such as a natural disaster (e.g., hurricane, earthquake, etc.) or other health and safety situations (e.g., mass shootings, accidents, etc.). Specifically, status messages among the individual users in each cluster could be displayed in the map (e.g., an affirmative response to user device indicating alive and responding, no response to another user's device possibly indicating an injury or fatality, etc.). Application users could share their status with family or an emergency contact group. Patient call out status, on the other hand, could be available as an application end point to an EMS authority with information such as the number of patients, pertinent medical histories and current medications.

VIII. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 16 conceptually illustrates an electronic system 1600 with which some embodiments of the invention are implemented. The electronic system 1600 may be a computer, phone, PDA, or any other sort of electronic device. Such an electronic system includes various types of computer readable media and interfaces for various other types of computer readable media. Electronic system 1600 includes a bus 1605, processing unit(s) 1610, a system memory 1615, a read-only 1620, a permanent storage device 1625, input devices 1630, output devices 1635, and a network 1640.

The bus 1605 collectively represents all system, peripheral, and chipset buses that communicatively connect the numerous internal devices of the electronic system 1600. For instance, the bus 1605 communicatively connects the processing unit(s) 1610 with the read-only 1620, the system memory 1615, and the permanent storage device 1625.

From these various memory units, the processing unit(s) 1610 retrieves instructions to execute and data to process in order to execute the processes of the invention. The processing unit(s) may be a single processor or a multi-core processor in different embodiments.

The read-only-memory (ROM) 1620 stores static data and instructions that are needed by the processing unit(s) 1610 and other modules of the electronic system. The permanent storage device 1625, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1625.

Other embodiments use a removable storage device (such as a floppy disk or a flash drive) as the permanent storage device 1625. Like the permanent storage device 1625, the system memory 1615 is a read-and-write memory device. However, unlike storage device 1625, the system memory 1615 is a volatile read-and-write memory, such as a random access memory. The system memory 1615 stores some of the instructions and data that the processor needs at runtime. In some embodiments, the invention's processes are stored in the system memory 1615, the permanent storage device 1625, and/or the read-only 1620. For example, the various memory units include instructions for processing appearance alterations of displayable characters in accordance with some embodiments. From these various memory units, the processing unit(s) 1610 retrieves instructions to execute and data to process in order to execute the processes of some embodiments.

The bus 1605 also connects to the input and output devices 1630 and 1635. The input devices enable the user to communicate information and select commands to the electronic system. The input devices 1630 include alphanumeric keyboards and pointing devices (also called "cursor control devices"). The output devices 1635 display images generated by the electronic system 1600. The output devices 1635 include printers and display devices, such as cathode ray tubes (CRT) or liquid crystal displays (LCD). Some embodiments include devices such as a touchscreen that functions as both input and output devices.

Finally, as shown in FIG. 16, bus 1605 also couples electronic system 1600 to a network 1640 through a network adapter (not shown). In this manner, the computer can be a part of a network of computers (such as a local area network ("LAN"), a wide area network ("WAN"), or an intranet), or a network of networks (such as the Internet). Any or all components of electronic system 1600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

IX. Manual Processes and Examples of User Interfaces

While several of the processes described above may be implemented as an information exchanging software applications that run on one or more processing unit(s) of computing device(s) or as mobile information exchanging apps that run on one or more mobile processor(s) of mobile computing devices (e.g., smartphones, handheld computing devices, tablet computing devices, etc.), some of the processes involved in using an information exchanging system are manual processes or partial manual processes. Such manual or partially manual processes involve direct user-based performance of one or more steps of said processes. One such manual process is described by reference to FIG. 17, which conceptually illustrates a manual process for adding a contact to exchange contact information 1700. The manual process for adding a contact to exchange contact information 1700 starts when a user of an information exchanging system manually creates (at 1705) a contact card of another contact. For example, the user may select a tool for creating a new contact profile in a user interface of an information exchanging software application or an information exchanging mobile app. In some embodiments, the user would manually select (at 1710) a synchronization invite tool from the new contact card to send a synchronization invitation to the contact. The synchronization invite tool, if accepted by the new contact, would allow contact information to automatically be added to the contact card. However, when synchronization of contact information is declined or when the contact information is sparse, then the user would manually input information about the contact, such as name, phone, communication addresses (e.g., email, SMS address, physical mailing address, etc.), and other such biographical and contact-related information.

After inviting the new contact to synchronize contact details, the user would check email or SMS (at 1715) for a synchronization invite response from the contact, or otherwise check the status of the synchronization invite (e.g., by checking the information exchanging system application GUI). In some embodiments, the user determines (at 1720) whether a synchronization invite response is received or not by checking the status, or via email or SMS text message (or application GUI). For instance, in some cases, the user will check an email account or an SMS account integrated with the information exchanging system, or just check in the application GUI. In some other cases, the user will check a third party email provider for an email response from the new contact. In yet other cases, another communication mechanism is provided for the user to check the status of the synchronization invitation in relation to the new contact's acceptance or rejection of the invite. When the synchronization invite response is not received, the user continues to check email for a synchronization invite response or otherwise check the status of the synchronization invite. However, when the synchronization invite response is received from the new contact, then the user determines (at 1725) whether the synchronization invite is accepted by the new contact. The user may check the status of the synchronization invite, for example, in the information exchanging system application GUI. When the synchronization invite is not accepted (either rejected or the status of the invite has been updated to rejected or is shown as not viewed for a specified duration of time), then the manual process for adding a contact to exchange contact information 1700 ends. As noted above, the user may wish to manually enter all the details of the new contact to update the information in the new contact card.

However, when the synchronization invite is accepted by the new contact, then in some embodiments of the information exchanging system, a tool for exchanging contact information is enabled in the user interface, thereby allowing the user to manually select (at 1730) the tool for exchanging contact information with the new contact. Next, the user decides (at 1735) whether to merge contact profiles related to the new contact into a single contact profile for the new contact. When the user decides to merge the contact profiles, the user may select a tool to merge contact profiles. However, when the user decides not to merge the contact profiles of the new contact (or if there is only one contact profile for the new contact), then the user would leave the merge contact tool alone and simple move ahead to link disparate contact profiles (at 1745) or simply end when there is only one contact profile for the new contact. Nevertheless, when the user selects the merge tool, then the contact profiles are merged (at 1750) into a single contact profile for the new contact. Then the manual process for adding a contact to exchange contact information 1700 ends.

When a user-driven manual process is performed, such as the manual process for adding a contact to exchange contact information 1700, a user interface and one or more user interface tools are involved in carrying out the steps of the process when the user interacts with the user interface. The following two examples demonstrate exemplary user interfaces and associated user interface tools which users of an information exchanging system employ to perform manual processes and/or to trigger software-implemented processes that are performed by one or more processing units of respective computing devices. The example user interfaces described by reference to FIGS. 18 and 19, are not intended as limiting the manner of interaction from a user, but are only provided to demonstrate examples of how a user may interact with an information exchanging system to share contact information between one or more contacts.

Therefore, by way of example, FIG. 18 conceptually illustrates a user interface to view and manage a contact share 1800. As shown in this figure, the user interface to view and manage a contact share 1800 includes a plurality of information detail windows comprising a user contact profile detail window 1805, a user shared contact profile detail window 1810, a related contact shared contact profiles detail window 1815, and a recent conversations detail window 1820. Interspersed among these information detail windows are a plurality of user interface tools comprising a set of communication and mapping tools 1825, information focus setting tools 1830, a shared contact profile delete tool 1835, a shared contact profile add tool 1840, a conversation add tool 1845, and a contact refresh tool 1850.

As shown in the user interface to view and manage a contact share 1800, the user contact profile detail window 1805 includes several fields of information for the contact profile of the user. While not shown in this figure, a remove tool could be displayed in the user contact profile detail window 1805 to indicate that the selected profile is to be removed. In some cases, the user may have a default contact profile that is visually output when no other contact profile of the user is selected. The fields of information shown in the user contact profile detail window 1805 relate to the information of the contact specifically for the contact profile on display. For instance, the address field may include the user's home address if the contact profile on display in the user contact profile detail window 1805 is a home contact profile of the user. Similarly, instead of showing a business telephone number, the mobile field may include the user's personal mobile number when the contact profile is the user's home contact profile, as well as for the information displayed in the email field (or SMS text field) and the video chat field. However, such information can be replicated in other contact profiles of the user. For instance, the mobile number of the user may be the same for the user's home contact profile and business contact profile.

Also shown in the user contact profile detail window 1805 are a set of communication and mapping tools 1825. Specifically, the communication and mapping tools in this example include a mapping tool that is triggered by selection of the globe icon adjacent to the address field, a phone communication tool that triggers a call to the mobile number listed in the mobile number field, an email communication tool that triggers an email client to open a new email message populated with the email address listed in the email field, and a video chat tool that triggers a video conferencing application and video capturing device to start a video chat session with respect to the user's video chat identification. Other tools and communication mechanisms are available as dictated by the contact profile information that is available for the respective contact profile. Additional tools could be added with the advent communication technology. Therefore, the set of communication and mapping tools 1825 is in no way limited to the tools shown in this figure, but are instead provided as an example of the many ways a user can interact with the user interface to view and manage a contact share 1800.

Moving on to the user shared contact profile detail window 1810 which includes a list of contact profiles another end user is sharing, and each user of the information exchanging system has at least one contact profile, but many users have multiple contact profiles. This is shown in the user shared contact profile detail window 1810, with the user's business contact profile shown on the first line and the user's personal (home) contact profile shown on the second line. Indented lines under the user's personal (home) contact profile include information pertaining directly to that contact profile, namely, the address of the user in relation to the user's personal (home) contact profile and the mobile number of the user in relation to the user's personal (home) contact profile. More information can be shown by an expansion operation (e.g., double clicking on the user shared contact profile detail window 1810). Selecting a particular contact profile results in the contact details being displayed in the user contact profile detail window 1805.

Also shown in the user shared contact profile detail window 1810 are a pair of information focus setting tools 1830. Technically, the information focus setting tools 1830 include a single tool represented by an arrow that is oriented to point sideways when focus is set to view high level details of the information and is oriented to point downward when focus is set to view detailed information related to the high level details. While the information focus setting tools shown here are related to the user's shared contact profiles, these tools are used generally wherever high level information includes more detailed information, whether in relation to a contact, a contact profile, a user's own contact profiles, conversation log entries, or any other information available by use of the information exchanging system.

Two more user interface tools are shown in the related contact shared contact profiles detail window 1815 with list of contact profiles being shared with another user. Specifically, the related contact shared contact profiles detail window 1815 includes a shared contact profile delete tool 1835 and a shared contact profile add tool 1840. A user can select the shared contact profile delete tool 1835 to remove the respective shared contact profile from his or her own directory. Note that a selection of the shared contact profile delete tool 1835 will not delete the shared contact profile with respect to the user who is associated with the shared contact profile. Instead, this shared contact profile delete tool 1835 only removes the shared contact profile of another contact from the present user's directory. In contrast to the shared contact profile delete tool 1835, the related contact shared contact profiles detail window 1815 also includes the shared contact profile add tool 1840, which allows the user to add another shared contact profile of the related contact presently shown in the related contact shared contact profiles detail window 1815.

The recent conversations detail window 1820 includes a listing of recent conversations, specifically, the high level details of the recent conversation log entries. Selection of any of the information focus setting tools 1830 will expand the information view shown about the respective conversation. Another tool shown here is the conversation add tool 1845, which allows the user to add a conversation to the list.

Finally, the user interface to view and manage a contact share 1800 includes a contact sync icon 1850 which indicates that the contact profile is synchronized. For example, a manually entered contact would not display the contact sync icon 1850 since the information in the manually entered contact would not have been synchronized as a contact share in the user interface to view and manage a contact share 1800. In some embodiments, the synchronization of a contact is automatic. However, the automatic synchronization is performed according to a refresh rate that depends, at least in part, on the availability of system resources. In some embodiments, the refresh rate for synchronizing contacts is in near real-time when system resources are available and permit synchronization. In some other embodiments, the refresh rate is not in real-time, which means automatic contact synchronization occurs at intervals or scheduled times (e.g., once per minute, once per hour, once per day, etc.).

In some embodiments, the contact sync icon 1850 doubles as a synchronization triggering tool which the user can select to trigger a contact synchronization request, even when the automatic synchronization is not at an interval or scheduled time to synchronize. For example, the refresh arrows shown on the contact sync icon 1850 may be animated to turn around in a circle to indicate the manual updates of previously synchronized contact information is ready to be synchronized, in which case the user may tap the animated contact sync icon 1850 to trigger synchronization of the manually updated contact information, thereby avoid a gap in time until the regularly scheduled synchronization is automatically performed. Thus, when the user selects the animated contact sync icon 1850, a background process is triggered whereby all information shown on the present user interface 1800 (including the manually updated contact information) is retrieved and transmitted to the information exchanging system to update the shared contact information stored in a database of the information exchanging system. In this scenario, the animated contact sync icon 1850 updates the shared contact information in relation to changes made by the user locally before the scheduled synchronization interval. However, when real-time synchronization (whether dependent on system resources or not) is available and enabled, the contact sync icon 1850 may not animate, but may simply become visible to indicate the affirmative synchronized status of the contact information.

Turning now to another example user interface, FIG. 19 conceptually illustrates a user interface to add a conversation log entry 1900. As shown in this figure, the user interface to add a conversation log entry 1900 includes a plurality of conversation log entry detail windows comprising a conversation status detail window 1905, a conversation meta-data detail window 1910, a conversation notes detail window 1915, a conversation follow-up detail window 1920, and conversation sharing detail window 1925.

The conversation status detail window 1905 appears at the conclusion of the communication, such as in this case, after a phone call ended (at 10:04). Upon completion of the communication, the conversation meta-data detail window 1910 gets populated with meta-data pertaining to the communication. In particular, the conversation which relates to the present communication is listed on the top of the conversation meta-data detail window 1910 (e.g., "Licensing of Product Technology ABC Conversation"), followed by details of the communication, such as the date, the communication initiator, the communication receiver, and the type of communication (e.g., phone call).

Conversation notes are recorded in the conversation notes detail window 1915. The user can jot down notes about the conversation or about upcoming plans related to the conversation, or anything else pertaining to the conversation. The user can also add media content to the notes by selection of a voice record note tool 1935 and an attach file tool 1930.

The user may need to follow up with the contact after the communication, and therefore, may select a communication follow up tool 1940, as shown in the conversation follow-up detail window 1920. Finally, the user can select a share note tool 1945, as shown in the conversation sharing detail window 1925, to share the notes of the communication with the other contact who participated in the communication, or any other contact of the user's choice. For example, when the user allows multiple contacts in case there was a conference call or group message.

In this way, the user can easily navigate conversations and contacts when accessing and using the information exchanging system. While the example user interfaces described above by reference to FIGS. 18 and 19 are limited to certain specific functions of using the information exchanging system, it is understood that similar user interfaces can be designed and implemented in relation to other specific features of working with the information exchanging system. Therefore, while the invention has been described with reference to numerous specific details, one of ordinary skill in the art will recognize that the invention can be embodied in other specific forms without departing from the spirit of the invention. For instance, FIGS. 2-6, 8-15, and 17 conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing an information exchanging program which, when executed by at least one processing unit of a computing device, relates a first organization to a second organization in an information exchanging system, the information exchanging program comprising sets of instructions for:
   receiving a selection, by an authorized user associated with a first organization, of a particular first organization profile from a plurality of first organization profiles associated with the first organization;
   searching for a target organization;
   receiving search results of target organizations identified by searching, wherein the search results comprise a plurality of organizations with accounts established on an information exchanging system;
   visually outputting, on a screen of a computing device, a list of the search results of the identified target organizations;
   receiving a selection, made by the authorized user associated with the first organization, of a particular second organization from the list of search results of the identified target organizations visually output on the screen;
   receiving a verification, performed visually by the authorized user associated with the first organization, that the particular second organization is intended for establishing an organization relation;
   determining whether acceptance of the particular second organization is required to add a first organization contact profile associated with the particular first organization to a directory of contacts associated with the particular second organization;
   sending a request, when the particular second organization requires acceptance, for the particular first organization to join the particular second organization;
   adding a second organization contact profile corresponding to the particular second organization to the directory of contacts associated with the first organization; and sending a notification to the second organization that the second organization contact profile was added to the directory of contacts associated with the first organization.

2. The non-transitory computer readable medium of claim 1, wherein the information exchanging program further comprises a set of instructions for receiving a set of organization search criteria aimed at identifying the particular second organization within the information exchanging system.

3. The non-transitory computer readable medium of claim 2, wherein the set of instructions for searching for the target organization comprises a set of instructions for performing a search query based on the set of organization search criteria aimed at identifying the particular second organization in the information exchanging system.

4. The non-transitory computer readable medium of claim 1, wherein the information exchanging program further comprises a set of instructions for determining whether acceptance is required from the particular second organization to add the second organization contact profile to the directory of contacts associated with the particular first organization.

5. The non-transitory computer readable medium of claim 4, wherein the information exchanging program further comprises a set of instructions for sending a request to add the second organization contact profile to the directory of contacts associated with the particular first organization when acceptance is required.

6. The non-transitory computer readable medium of claim 1, wherein the information exchanging program further comprises sets of instructions for:
    determining whether the request for the particular first organization to join the particular second organization is accepted by the particular second organization; and
    adding the first organization contact profile associated with the particular first organization to the directory of contact profiles of the second organization when the request for the particular first organization to join the particular second organization is accepted by the particular second organization.

7. The non-transitory computer readable medium of claim 6, wherein the set of instructions for sending a notification further comprises a set of instructions for sending a notification to the particular first organization that the second organization contact profile was added to the directory of contacts associated with the first organization.

8. The non-transitory computer readable medium of claim 6, wherein the set of instructions for sending a notification further comprises sets of instructions for:
    sending an acceptance notification, by the information exchanging system, to the second organization that the first organization contact profile associated with the particular first organization was added to the directory of contact profiles of the second organization when the request for the particular first organization to join the particular second organization was accepted by the particular second organization; and
    sending a rejection notification, by the information exchanging system, to the second organization that the first organization contact profile associated with the particular first organization was not added to the directory of contact profiles of the second organization when the request for the particular first organization to join the particular second organization was rejected by the particular second organization.

9. The non-transitory computer readable medium of claim 8, wherein the set of instructions for sending the rejection notification comprises a set of instructions for sending a rejection of request to join notification, by the information exchanging system, to the particular first organization that the first organization contact profile associated with the particular first organization was not added to the directory of contact profiles of the second organization when the request for the particular first organization to join the particular second organization was rejected by the particular second organization.

10. The non-transitory computer readable medium of claim 6, wherein the set of instructions for sending a notification further comprises a set of instructions for sending a notification, by the information exchanging system, to the particular first organization that the first organization contact profile associated with the particular first organization was added to the directory of contact profiles of the second organization.

11. The non-transitory computer readable medium of claim 1, wherein the information exchanging program further comprises a set of instructions for receiving data entry for adding manually input second organization information related to the second organization contact profile associated with the second organization to the directory of contact profiles of the first organization.

12. The non-transitory computer readable medium of claim 1, wherein the directory of contact profiles of the first organization includes at least one first organization administrative user with administrative rights to the directory of contact profiles of the first organization of the information exchanging system.

13. The non-transitory computer readable medium of claim 12, wherein the directory of contact profiles of the second organization includes at least one second organization administrative user with administrative rights to the directory of contact profiles of the second organization of the information exchanging system.

* * * * *